US012398564B2

(12) United States Patent
Bruckerhoff et al.

(10) Patent No.: US 12,398,564 B2
(45) Date of Patent: Aug. 26, 2025

(54) ROOFING SYSTEM AND METHOD OF INSTALLATION

(71) Applicant: CertainTeed LLC, Malvern, PA (US)

(72) Inventors: Aaron Bruckerhoff, Medfield, MA (US); Michael Garnick, Watertown, MA (US); Ulysse Van Duinen, Lexington, MA (US); Boris L. Serebrennikov, Shrewsbury, MA (US); Phillip Evans, Littleton, MA (US); Sahas Rathi, Shrewsbury, MA (US); Hooman Amid, Worcester, MA (US); Rakshith Srinivasa, San Diego, CA (US)

(73) Assignee: CERTAINTEED LLC, Malvern, PA (US)

(*) Notice: Subject to any disclaimer, the term of this patent is extended or adjusted under 35 U.S.C. 154(b) by 129 days.

(21) Appl. No.: 17/886,992

(22) Filed: Aug. 12, 2022

(65) Prior Publication Data
US 2023/0045972 A1 Feb. 16, 2023

Related U.S. Application Data

(60) Provisional application No. 63/300,453, filed on Jan. 18, 2022, provisional application No. 63/233,572, filed on Aug. 16, 2021.

(51) Int. Cl.
*E04D 12/00* (2006.01)
*E04D 1/00* (2006.01)
*E04D 1/34* (2006.01)

(52) U.S. Cl.
CPC ........... *E04D 12/006* (2013.01); *E04D 1/29* (2019.08); *E04D 1/34* (2013.01); *E04D 2001/3408* (2013.01)

(58) Field of Classification Search
CPC ..... E04D 12/00; E04D 12/004; E04D 12/006; E04D 12/008; E04D 11/005; E04D 1/29;
(Continued)

(56) References Cited

U.S. PATENT DOCUMENTS

| 3,492,545 A | 1/1970 | Meyerhoff |
| 5,711,116 A | 1/1998 | Hasan |
(Continued)

FOREIGN PATENT DOCUMENTS

| AU | 2011201649 B2 | 10/2011 |
| GB | 2176219 A | 12/1986 |
(Continued)

OTHER PUBLICATIONS

International Search Report and Written Opinion for PCT Application No. PCT/US2023/060824, dated May 11, 2023, 11 pages.
(Continued)

*Primary Examiner* — Chi Q Nguyen
(74) *Attorney, Agent, or Firm* — Abel Schillinger, LLP; Stephen Eland

(57) ABSTRACT

A roofing system includes a plurality of riser blocks disposed on a support surface. The riser blocks include a group that is aligned in a row. A batten extends along the row and is supported by the group of riser blocks. The batten includes a first clip portion. A group of roofing panels is disposed along the row and is supported by the batten. Further, each of the roofing panels of the group includes a front surface, a rear surface, and a second clip portion extending from the rear surface. The second clip portion is configured to engage the first clip portion of the batten so as to secure the roofing panels to the batten.

20 Claims, 14 Drawing Sheets

(58) Field of Classification Search
CPC ....... E04D 1/2907; E04D 1/2921; E04D 1/34; E04D 2001/3408; E04D 2001/3411; E04D 2001/3429
See application file for complete search history.

(56) References Cited

U.S. PATENT DOCUMENTS

| | | | | |
|---|---|---|---|---|
| 6,730,841 | B2* | 5/2004 | Heckeroth | E04D 13/1585 52/173.3 |
| 6,750,391 | B2 | 6/2004 | Bower et al. | |
| 7,386,962 | B2 | 6/2008 | Estes et al. | |
| 7,877,957 | B2 | 2/2011 | Vandewater, Jr. | |
| 8,025,508 | B2 | 9/2011 | Parker et al. | |
| 8,215,070 | B2 | 7/2012 | Railkar et al. | |
| 8,240,109 | B2 | 8/2012 | Cusson et al. | |
| 8,256,169 | B2 | 9/2012 | Cusson et al. | |
| 8,475,185 | B2 | 7/2013 | Rivera et al. | |
| 8,707,648 | B2 | 4/2014 | Timko et al. | |
| 8,713,881 | B2 | 5/2014 | DuPont et al. | |
| 8,740,163 | B1 | 6/2014 | Taylor et al. | |
| 8,833,714 | B2* | 9/2014 | Haddock | F24S 25/615 248/500 |
| 8,898,978 | B2* | 12/2014 | Murray | E04D 1/34 52/302.1 |
| 8,938,928 | B2 | 1/2015 | Alingh | |
| 9,035,176 | B2 | 5/2015 | Keller | |
| 9,170,034 | B2 | 10/2015 | Bosler et al. | |
| 9,611,652 | B2* | 4/2017 | Haddock | F24S 25/615 |
| 10,233,652 | B1* | 3/2019 | Hogan | E04B 9/26 |
| 10,797,634 | B1* | 10/2020 | Jasmin | H02S 30/00 |
| 10,859,292 | B2* | 12/2020 | Haddock | F24S 25/636 |
| 11,371,247 | B2* | 6/2022 | Fahle | E04F 13/0826 |
| 11,664,761 | B2* | 5/2023 | Stearns | H02S 20/23 52/173.3 |
| 2004/0148898 | A1 | 8/2004 | Hick | |
| 2006/0080942 | A1 | 4/2006 | O'Neill | |
| 2007/0113508 | A1 | 5/2007 | Hay et al. | |
| 2008/0302407 | A1* | 12/2008 | Kobayashi | F24S 25/632 52/173.3 |
| 2012/0005979 | A1 | 1/2012 | Carranza | |
| 2012/0216465 | A1 | 8/2012 | Vari | |
| 2012/0291382 | A1 | 11/2012 | Bussell | |
| 2013/0167470 | A1* | 7/2013 | Montgomery | F16B 2/065 24/519 |
| 2013/0239495 | A1 | 9/2013 | Pao et al. | |
| 2014/0261638 | A1 | 9/2014 | Haddock et al. | |
| 2015/0249423 | A1* | 9/2015 | Braunstein | F16B 5/0685 52/173.3 |
| 2019/0363667 | A1* | 11/2019 | Braunstein | F24S 25/33 |

FOREIGN PATENT DOCUMENTS

| | | |
|---|---|---|
| GB | 2402405 A | 12/2004 |
| JP | 2016073037 A | 5/2016 |
| KR | 102332883 B1 | 12/2021 |
| WO | 2023141457 A1 | 7/2023 |

OTHER PUBLICATIONS

"Wire and Cable Insulation Materials" Technical Information, Bookmark Bar Customer Tools, 12 pages.
"Zygology Galvanic Corrosion Chart", Zygology Ltd, 3 pages.

* cited by examiner

ROOFING SYSTEM AND METHOD OF INSTALLATION

CROSS-REFERENCE TO RELATED APPLICATIONS

This application claims the benefit of priority of U.S. Provisional Application no. 63/233,572, filed Aug. 16, 2021, and 63/300,453, filed Jan. 18, 2022, which are each hereby incorporated herein by reference in their entirety.

BACKGROUND OF THE DISCLOSURE

1. Field of the Disclosure

The present disclosure relates generally to roofing systems, for example, suitable for covering the roof of a house or other building. The present disclosure relates more particularly to a roofing system including a plurality of panels attached to a surface structure.

2. Technical Background

Roofing systems typically include a roof surface structure formed by a roofing frame that provides the overall shape of the roof. A surface layer may then be formed over and supported by the frame. The surface layer frequently includes a decking or sheathing that is covered by one or more weather resistant layers. For example, roofs are often covered with shingles that shed water and protect the roof from weather. Moving up the slope of the roof, rows of shingles are placed on top of lower rows so that water may be directed away from the surface structure. Various types of shingles can be secured directly to the surface structure, for example, by using roofing nails.

In other roofing systems there may be advantages to indirect attachment of the weather resistant layer to the surface structure. For example, with some types of roofing panels, such as various types of roofing tiles or solar panels, a direct connection to the surface structure may be less appropriate.

The present inventors have determined that a roofing system configured to secure roofing panels to a surface structure that is effective and easy to install would be attractive to builders and customers.

SUMMARY OF THE DISCLOSURE

In one aspect, the present disclosure provides a roofing system comprising:
a plurality of riser blocks disposed on a support surface, the plurality of riser blocks including a first group of riser blocks aligned in a first row;
a first batten extending along the first row and supported by the first group of riser blocks, the first batten including a first clip portion; and
a first group of roofing panels disposed along the first row and supported by the first batten, each of the roofing panels of the first group of roofing panels including a front surface, a rear surface, and a second clip portion extending from the rear surface, the second clip portion being configured to engage the first clip portion of the batten so as to secure the roofing panels to the batten.

In another aspect, the disclosure provides a method of installing a roofing system of the disclosure, the method comprising:
positioning the first batten on the first group of riser blocks; and
securing the first group of roofing panels to the first batten by coupling the second clip portion of each roofing panel to the first clip portion of the first batten.

In another aspect, the disclosure provides another roofing system comprising:
a plurality of battens including a first batten and a second batten, wherein each batten of the plurality of battens comprises a body including a rear surface formed by a mounting base, a front surface formed by a support platform and configured to support a roofing panel, and a support ledge disposed behind the front surface that extends along a length of the batten;
a spring disposed at an upper end of the support ledge of the first batten and configured to compress in an upward direction; and
a first roofing panel extending from the first batten to the second batten, the first roofing panel including an upper edge, a lower edge, a front surface, a rear surface, and a hook extending from the rear surface, wherein the rear surface of the first roofing panel is supported by the front surface of the second batten, the hook of the first roofing panel engages the second batten so as to secure the first roofing panel to the second batten, and the upper edge of the first roofing panel engages the spring and is urged downward by the spring so as to maintain the engagement of the hook of the first roofing panel with the second batten.

In another aspect, the disclosure provides another method of installing a roofing system of the disclosure, the method comprising:
positioning the first batten and the second batten over a surface structure;
positioning an upper edge of the first roofing panel against the spring of the first batten;
compressing the spring such that hook of the first roofing panel is positioned above the second batten; and
positioning the hook of the first roofing panel to engage the second batten.

In another aspect, the disclosure provides another roofing system comprising:
a first roofing panel including an upper edge, a lower edge, a first side edge, and a second side edge;
a first support bracket disposed on a surface structure, the first support bracket comprising:
  a front surface that supports the first roofing panel,
  first and second legs extending rearward from the front surface and holding the front surface at a distance from the surface structure,
  a lower hook disposed at a lower end of the front surface and holding the lower edge of the first roofing panel, and
  a spring disposed at an upper end of the front surface and engaging the upper edge of the first roofing panel so as to maintain the first roofing panel in the lower hook.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that a roofing system configured to secure roofing panels to a surface structure that is effective and easy to install would be attractive to builders and customers.

Accordingly, one aspect of the disclosure is a roofing system that includes a plurality of riser blocks disposed on a support surface. The plurality of riser blocks includes a first group of riser blocks aligned in a first row. A first batten extends along the first row and is supported by the first group of riser blocks. The first batten includes a first clip portion. A first group of roofing panels is disposed along the first row and supported by the first batten. Further, each of the roofing panels of the first group of roofing panels includes a front surface, a rear surface, and a second clip portion extending from the rear surface. The second clip portion is configured to engage the first clip portion of the batten so as to secure the roofing panels to the batten.

Figure 1:
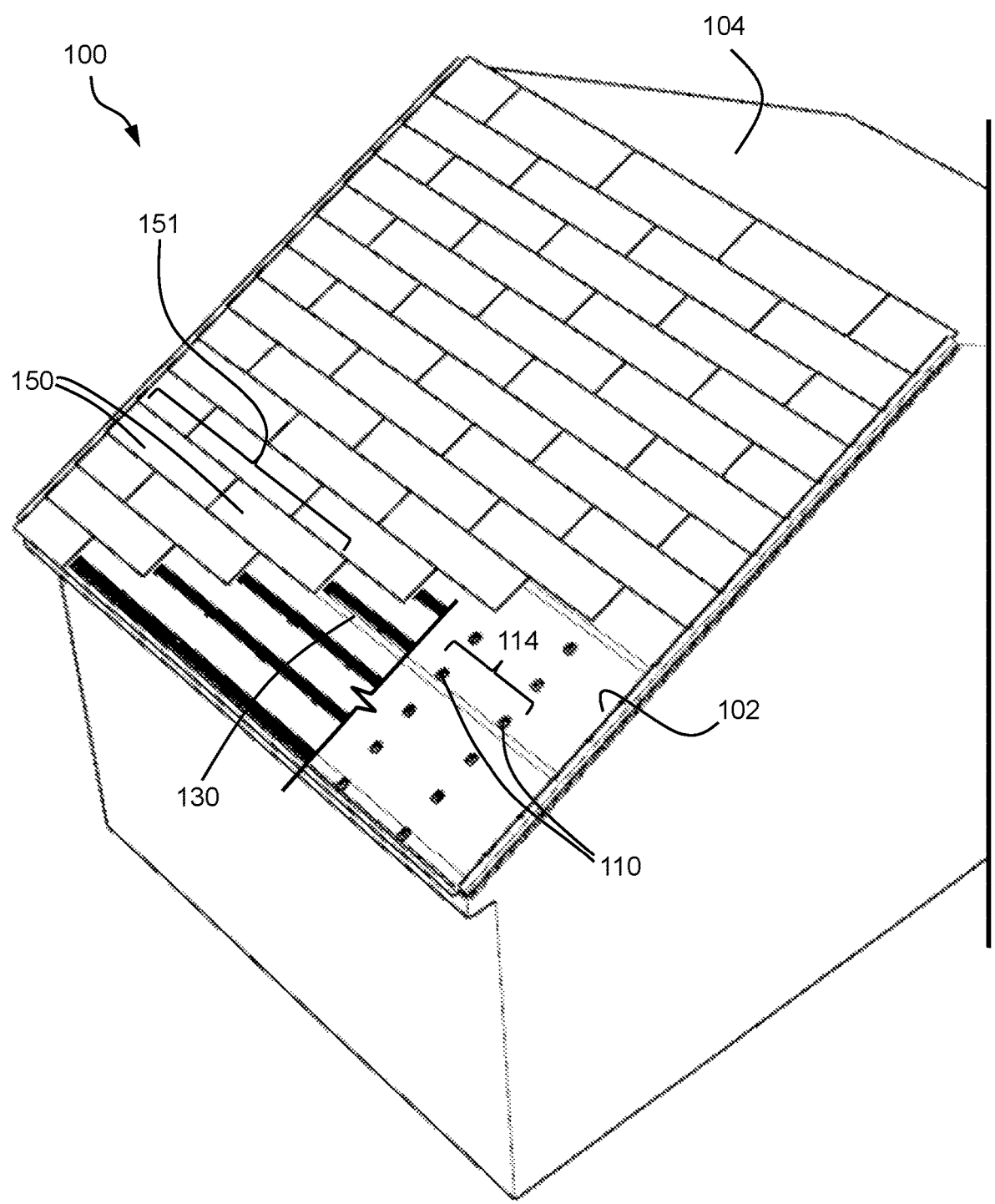
FIG. 1 is a schematic perspective view of a roofing system according to an embodiment of the disclosure.

Such a roofing system is shown in perspective view in FIGS. 1. Roofing system 100 is disposed on sloped surface structure 102 of a building 104. Surface structure 102 is formed by a sheathing that is positioned on a roof frame. Roofing system 100 includes a plurality of riser blocks 110 arranged in rows including first row 114 formed by a first group of the riser blocks. Each of the rows of riser blocks, including first row 114, extends across the surface of the roof. In other words, the riser blocks in each row are positioned at similar positions with respect to the slope of the roof and extend across the roof at similar elevations. Moreover, the different rows of riser blocks in roofing system 100 are positioned at different locations over the slope of the roof. On the other hand, in other embodiments, the rows of riser blocks may extend over the roof in other directions.

Roofing system 100 also includes battens that extend along the rows of riser blocks, including a first batten 130 that extends along first row 114. As explained in more detail below, the first batten 130 is supported by the first group of riser blocks in first row 114. Likewise, each of the other battens is also supported by riser blocks on the surface structure. For clarity, a portion of each of the battens is removed in FIG. 1 so that some of the riser blocks are visible.

A plurality of roofing panels are disposed over the battens and supported by the battens. The roofing panels 150 of roofing system 100 are aligned in rows over the battens and include a first group 151 of roofing panels that is disposed along first row 114 and is supported by first batten 130. For clarity several of the roofing panels of roofing system 100 are removed so that the battens and riser blocks are visible.

While the first group 151 of roofing panels in roofing system 100 are positioned in a straight row along first batten 130, in other embodiments, the roofing panels supported by the first batten may have a non-linear configuration. For example, in some embodiments, the position of the roofing panels secured to the first batten may have a staggered configuration, with some battens positioned higher and some positioned lower.

Figure 2:
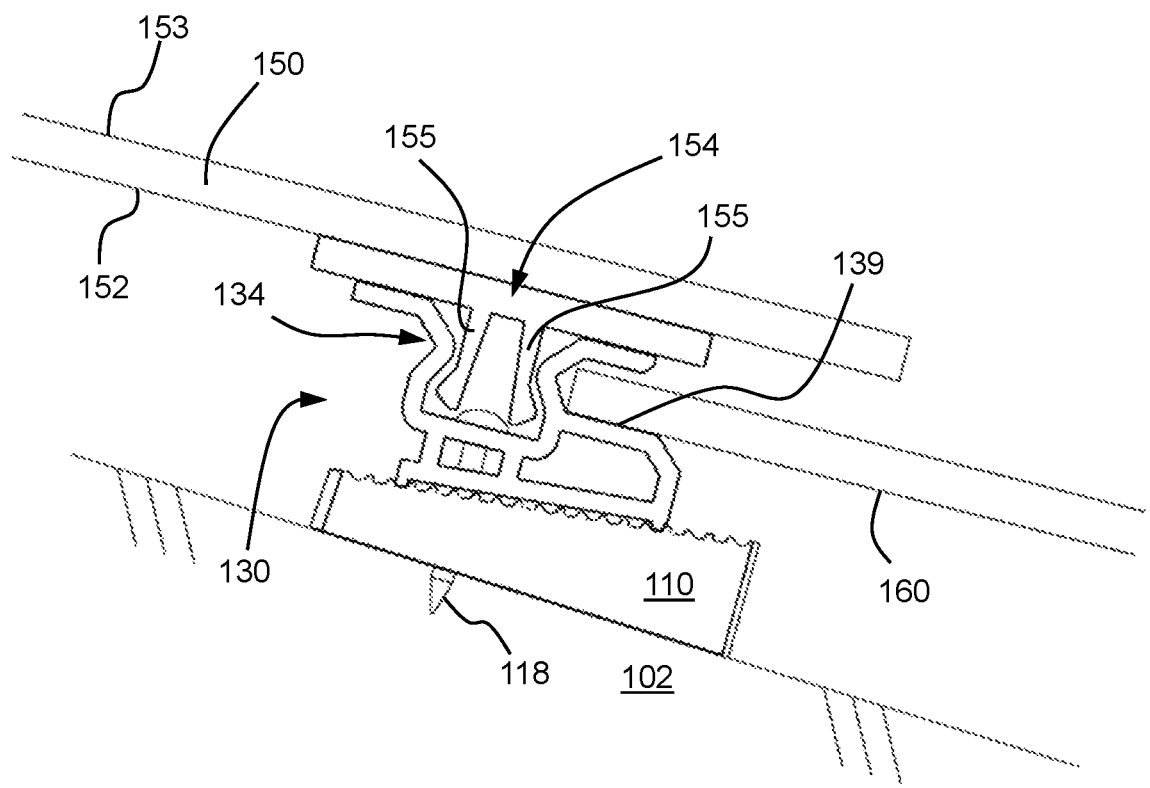
FIG. 2 is a schematic side view of a section of the roofing system of FIG. 1.

FIG. 2 shows a side view of a portion of the roofing system of FIG. 1 and includes a riser block 110 from first row 114, the first batten 130 positioned on riser block 110, and a roofing panel 150 from the first group of roofing panels. Specifically, roofing panel 150 includes a rear surface 152 that faces the underlying surface structure 102 and a front surface 153 that is exposed. The front side of first batten 130 includes a first clip portion 134 that secures roofing panel 150 in place by attaching to a second clip portion 154 that extends from the rear surface 152 of roofing panel 150. The terms front and rear, as used herein, refer to a direction that is perpendicular to a surface of the surface structure. In contrast, the directions along the slope of the surface structure are referred to herein as upper and lower.

The use of a group of riser blocks and a batten to support a row of roofing panels allows for flexibility in the placement of the connection between of the roofing system independent of the positioning of the roofing panels. For example, each of the riser blocks can be positioned to be secured to a strong portion of the surface structure, such as the location of a rafter. The battens can then be placed on the riser blocks and the roofing panels secured to the battens in appropriate locations based on the overall size and shape of the roof, irrespective of the specific positions of the riser blocks.

Moreover, raising the battens off of the surface structure provides open paths over the surface structure that can run across the entire roof or over the entire slope of the roof. The available space on top of the surface structure and the associated paths can be utilized to house components of the roof system, route wires and provide additional drainage.

In certain embodiments of the roofing system as otherwise described herein, the first batten is secured to the support surface using a first group of mechanical fasteners. For example, FIG. 2 shows a mechanical fastener 118 in the form of a nail extending through riser block 110 and into surface structure 102. The penetration of the nail 118 into the surface structure 102 holds first batten 130 securely on the roof. Other nails are similarly positioned along the length of first batten 130 to secure it to surface structure 102. In some embodiments, the first batten includes respective apertures for receiving each of the mechanical fasteners. In other embodiments, the first batten is configured to allow the mechanical fasteners to be driven through the structure of the batten. For example, in some embodiments, the batten has a screen or deformable area that allows one or more mechanical fasteners to pass therethrough.

While the mechanical fasteners used in roofing system 100 are nails, in other embodiments, the first batten is secured to the surface structure with other mechanical fasteners, such as screws or staples. Moreover, in some embodiments, the first batten is secured to the surface structure in another manner. For example, in some embodiments, the first batten is indirectly secured to the surface structure, such as via the riser blocks. For example, in some embodiments the first batten is attached to the riser blocks and the riser blocks are separately attached to the surface structure.

In certain embodiments of the roofing system as otherwise described herein, each of the mechanical fasteners of the first group of mechanical fasteners extends through a respective riser block. For example, as shown in FIG. 2, the head of nail 118 is secured against first batten 130 and the shaft of nail 118 extends through riser block 110 and into surface structure. This allows the mechanical fasteners to be used to simultaneously secure both the riser blocks and the battens.

Figure 3:
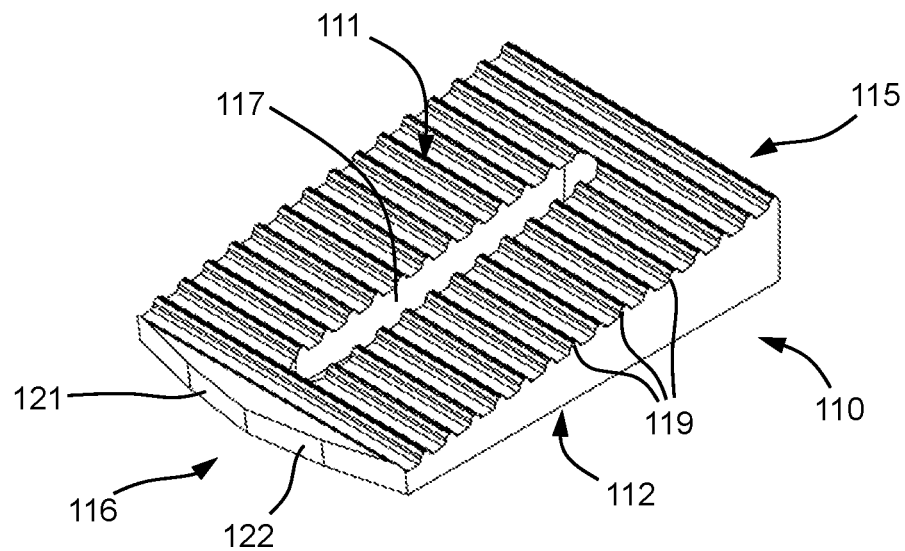
FIG. 3 is a schematic perspective view of a riser block of the roofing system of FIG. 1.

In certain embodiments of the roofing system as otherwise described herein, each riser block includes a slot configured to receive a mechanical fastener. For example, FIG. 3 shows a perspective view of riser block 110 including a slot 117. The slot 117 passes through riser block 110 from the front face 111 to the rear face 112 and extends along the height of riser block 110 between the lower side 115 and upper side 116. Slot 117 allows the respective positions of mechanical fastener and riser block 110 to be adjusted with respect to the slope of the roof, as explained further below.

In certain embodiments of the roofing system as otherwise described herein, each of the riser blocks is tapered so as to have a greater depth at a lower side and a smaller depth at an upper side. For example, as shown in FIG. 3, riser block 110 has a greater depth at the lower side 115 and a smaller depth at the upper side 116, thereby causing the front face 111 of riser block 110 to be angled in relation to the rear face 112. As shown in FIG. 2, the angled front face 111 of riser block 110 reduces the slope of front face 111 with respect to gravity compared to the surface structure 102 of the roof. This diminished angle of the front face 111 of riser block 110 can help stabilize the first batten 130 when it is placed on riser block 110 but before it is secured, for example, by using a mechanical fastener.

The angle of front face 111 also allows the depth of the support provided by riser block 110 to first batten 130 to be varied based on the position of riser block 110 along the slope of the roof. By placing riser block 110 higher on the roof, the first batten 130 is positioned closer to the lower side 115 of riser block 110 where it will be held further from the surface of surface structure 102. In contrast, by placing riser block lower on the roof, first batten 130 is positioned closer to the upper side 116 of riser block 110, where it will be held closer to the surface of surface structure 102. Thus, by modifying the position of the riser blocks along the length of the batten, the riser blocks can provide level support to the batten regardless of undulations or fluctuations in unevenness in the surface of the surface structure. Indeed, in some embodiments, the riser blocks disposed along the first row are positioned at different heights along the slope of the roof. For example, the positions may be sufficiently similar that all of the riser blocks can support the batten, but the positions can also be slightly varied so that the batten can be raised from the surface of the surface structure by different amounts.

In certain embodiments of the roofing system as otherwise described herein, an upper side of each riser block includes an angled surface. Such an angled surface can help avoid water pooling on top of the riser block. For example, as shown in FIG. 3, the upper side 116 of riser block 110 includes a first angled surface 121 and a second angled surface 122 that each extend outward from an apex toward the center of riser block 110. Accordingly, water that runs down toward riser block 110 will contact upper side 116 and run down away from the apex toward the lateral sides of riser block 110 and further down the roof. While, riser block 110 includes two angled surfaces, in other embodiments, the upper side of the riser block includes a single angled surface that directs water toward one lateral side of the riser block. Further, in other embodiments, the riser block may include one or more channels for directing water through the riser block, rather than around the riser block.

Figure 4:
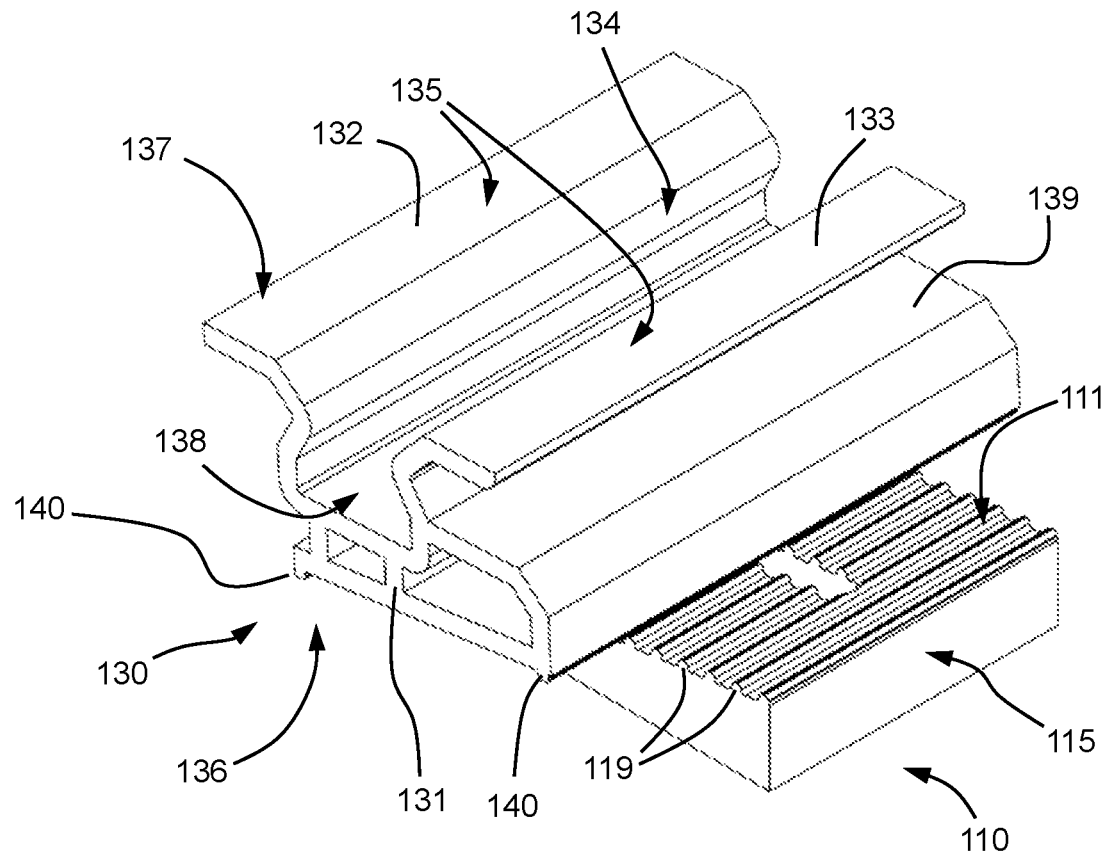
FIG. 4 is a schematic perspective view of a section of a batten of the roofing system of FIG. 1 secured to the riser block of FIG. 3.

In certain embodiments of the roofing system as otherwise described herein, a front face of each riser block includes protrusions that engage the first batten. For example, front face 111 of riser block 110 includes a plurality of protrusions in the form of ridges 119 that extend across its width and are configured to engage the first batten 130 so as to secure it in place. For example, FIG. 4 shows a cutaway section of first batten 130 secured to riser block 110 with first batten engaging the ridges 119 of front face 111. While riser block 110 includes elongate ridges 119 that extend across the entire width of front face 111, in other embodiments, the protrusions may only extend across a portion of the riser block. For example, in some embodiments, only a portion of the front face includes such protrusions. Further, in some embodiments the entire front face includes protrusions for securing the batten thereon, but each protrusions extends only partially across the riser block. For example, in some embodiments the protrusions are in the form of an array of bumps, or another texture. Further still, in some embodiments, the front face of the riser block does not include any texture.

While each of the riser blocks in the plurality of riser blocks that are shown and described above have the same configuration, in other embodiments, the roofing system may include additional riser blocks that have other configurations.

In certain embodiments of the roofing system as otherwise described herein, a width of each riser block is at least 1 inch, e.g., at least 1.5 inches, e.g., at least 2 inches, e.g., at least 3 inches. Further, in certain embodiments, of the roofing system as otherwise described herein, the width of each riser block is no more than 8 inches, e.g., no more than 6 inches. For example, in some embodiments, the width of each riser block is in a range from 2 inches to 8 inches, e.g., from 3 inches to 6 inches.

In certain embodiments, the riser blocks in the first group of riser blocks are connected by a tether, such as in the form of a cable, cord, or other line. The tether can be used to simplify installation of the riser blocks by keeping the riser blocks together thereby avoiding the risk of misplacing one of the riser blocks. Further, in some embodiments, the length of the tether between adjacent connected riser blocks may correspond to the spacing of the riser blocks on the surface structure. Accordingly, the placement of the riser blocks on the surface structure may be guided by the length of the tether between the riser blocks.

In certain embodiments of the roofing system as otherwise described herein, at least one of the first clip portion and second clip portion is configured to flex upon engagement of the first clip portion and second clip portion. For example, in some embodiments, the first and second clip portions are configured so that either or both of the clip portions are deformed as the clip portions engage one another. As the first and second clip portions are pushed together, a force on the clip portions can cause at least one of the clip portions to deform so as to allow the clip portions to move into an attached position. Once the clip portions are connected, they are securely fastened, as a counter force is required to separate the clip portions. Further, in some embodiments the clip portions may be adapted so that a greater force is needed to disconnect the clip portions than to connect them.

In certain embodiments of the roofing system as otherwise described herein, the first clip portion includes a groove that receives the second clip portion. For example, as shown in FIG. 4, first clip portion 134 of first batten 130 includes a groove 138 that receives the second clip portion of roofing panel, which is the form of a pair of projections, as described in further detail below. Groove 138 is formed by a first arm 132 and opposing second arm 133 that extend up from a base 131. Specifically, groove 138 is formed in the space between first arm 132 and second arm 133.

While the first clip portion 134 of first batten 130 is configured to receive the second clip portion 154 of roofing panel 150 in roofing system 100, in other embodiments, the first clip portion of the batten is configured to be inserted into the second clip portion of the roofing panel. For example, in some embodiments, the second clip portion of the roofing panel is configured as a groove and the first clip portion of the batten includes a projection that is inserted into the second clip portion. Further, in other embodiments, the first and second clip portions are configured as a pair of hooks or other clip configurations that cooperate to form a connection.

In certain embodiments of the roofing system as otherwise described herein, a front surface of the first batten includes a support platform adjacent to the groove, and the support platform supports the rear surface of each roofing panel in the first group of roofing panels. In some embodiments the support platform includes a first section disposed above the groove and a second section disposed below the groove. For example, as shown in FIG. 4, the front surface 137 of first batten 130 includes a support platform 135 that is formed in two sections by the first arm 132 and second arm 133, respectively, on either side of the groove 138. Specifically, first arm 132 forms a section of support platform 135 that is above groove 138 and second arm 133 forms a section of support platform 135 that is below groove 138. FIG. 2 illustrates how the roofing panel 150 is supported by first batten 130.

In certain embodiments of the roofing system as otherwise described herein, the support platform is sloped with respect to a rear surface of the first batten. For example, as shown in FIG. 4, support platform 135 is sloped with respect to rear surface 136 of first batten 130, with the lower side of support platform 135 being closer to rear surface 136 and the upper side of support platform 135 being further from rear surface 136. As a result, support platform 135 is at an increased angle compared to rear surface 136 of first batten 130 and, likewise, an increased angle compared to front face 111 of riser block 110. Accordingly, this angled support platform 135 can counter at least some of the reduction in slope provided by riser block 110, such that the roofing panel 150 resting on support platform 135 is at the same or a closer angle to the roof slope than the front face 111 of riser block 110 (FIG. 2). Alternatively, in other embodiments, the support platform is flat with respect to the rear surface of the batten.

In certain embodiments of the roofing system as otherwise described herein, the first batten includes a support ledge behind a front surface of the first batten that is configured to support an upper edge of each panel in a second group of panels. For example, as shown in FIG. 4, first batten 130 includes a support ledge 139 behind front surface 137. The support ledge 139 is configured to support an upper edge of another panel that is positioned below the panel secured by the cooperating clip portions. The term behind, as used in this context, means closer to the rear surface of the batten, but not necessarily obscured. Thus, while the support ledge 139 of first batten 130 is both behind and obscured by second arm 133, it is behind but not obscured by first arm 132 at the top of the batten. FIG. 2 shows the support ledge 139 holding the upper edge of a roofing panel 160 that is part of a lower row of roofing panels.

In certain embodiments of the roofing system as otherwise described herein, the support ledge is sloped with respect to a rear surface of the first batten. For example, similar to support platform 135, support ledge 139 is sloped with respect to rear surface 136, with the lower side of support ledge 139 being closer to rear surface 136 and the upper side of support ledge 139 being further from rear surface 136. As a result, support ledge is also at an increased angle compared to rear surface 136 and compared to front face 111 of riser block 110. Accordingly, support ledge 139 can also counter at least some of the reduction in slope provided by riser block 110, such that the second roofing panel 160 resting on support ledge 139 is at the same or a closer angle to the roof slope than front face 111 of riser block 110. Alternatively, in other embodiments, the support ledge is flat with respect to the rear surface of the batten.

Figure 5:
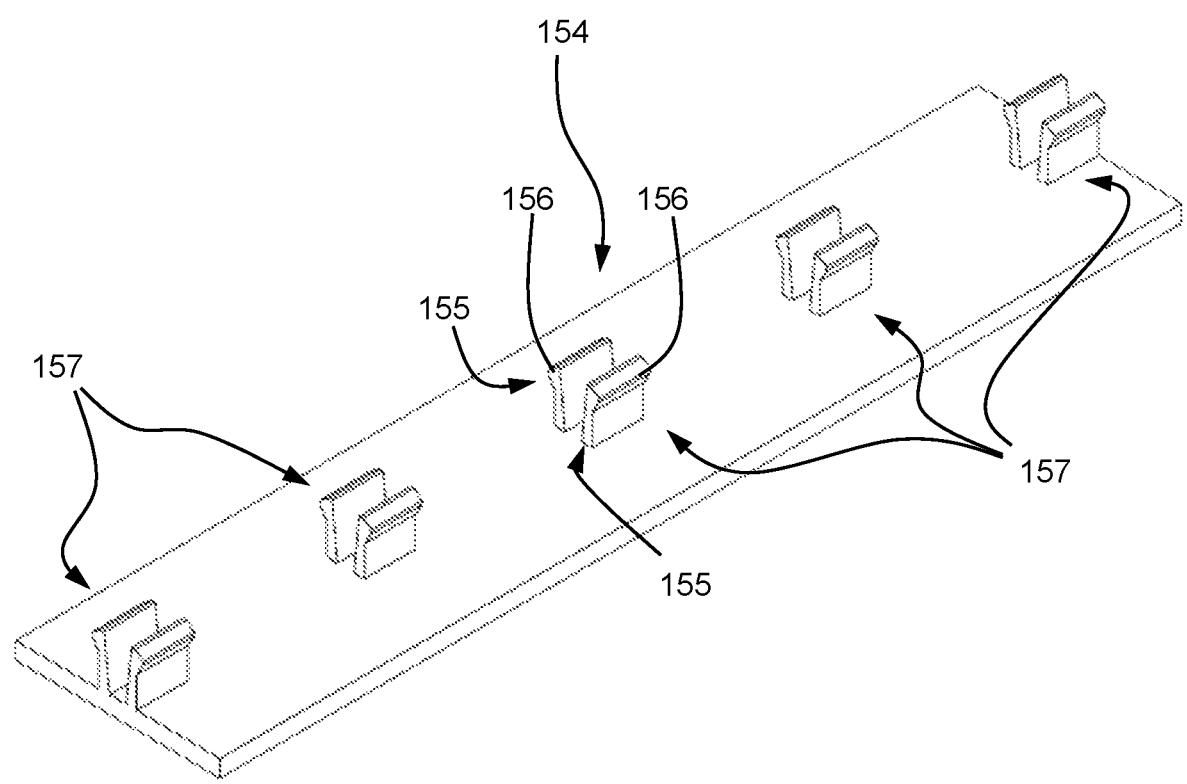
FIG. 5 is a schematic perspective view of a second clip portion of the roofing system of FIG. 6 is a schematic perspective view of components of a roofing system according to an embodiment of the disclosure.

In certain embodiments of the roofing system as otherwise described herein, the second clip portion includes a pair of projections each with an outwardly extending hook that engages the first clip portion. For example, as shown in FIG. 2, second clip portion 154 extending from the rear surface 152 of roofing panel 150 includes a pair of projections 155 that are inserted into first clip portion 134 of first batten 130. As depicted in FIG. 5, each of the projections 155 includes an outwardly extending hook 156. As can be seen in FIG. 2, the hooks are within the groove of first clip portion 134 to secure roofing panel 150 to batten 130.

In certain embodiments of the roofing system as otherwise described herein, the second clip portion includes a plurality of clip segments that engage the first clip portion of the first batten. For example, as shown in FIG. 5, second clip portion includes a plurality of clip segments 157 that engage first clip portion of the first batten. Each of the clip segments 157 of second clip portion 154 includes both projections 155 so that each of the clip segments 157 forms a strong connection with the first clip portion of the first batten 130. In other embodiments, the second clip portion of each roofing panel is formed as continuous element along the length of the roofing panel.

In certain embodiments of the roofing system as otherwise described herein, the respective second clip portion of each roofing panel is attached to the panel body. For example, second clip portion 154 of roofing panel 150, as shown in FIG. 2, is attached directly to the rear surface 152 of the panel body of roofing panel 150.

In certain embodiments of the roofing system as otherwise described herein, each roofing panel includes a frame that holds the panel body, and the respective second clip portion of each roofing panel is secured to the frame. For example, in some embodiments, the second clip portion is attached to the frame, such as through the use a fastener. In other embodiments, the second clip portion is bonded to the frame, such as with an adhesive. Further still, in some embodiments, the second clip portion is integrally formed in the frame of the roofing panel.

In another aspect, the disclosure provides a roofing system including a plurality of battens including a first batten and a second batten and a first roofing panel extending from the first batten to the second batten. Each of the battens includes a body having a rear surface formed by a mounting base, a front surface formed by a support platform that is configured to support a roofing panel, and a support ledge disposed behind the front surface that extends along a length of the batten. The roofing system also includes a spring disposed at an upper end of the support ledge of the first batten that is configured to compress in an upward direction. The first roofing panel includes an upper edge, a lower edge, a front surface, a rear surface, and a hook extending from the rear surface. The rear surface of the first roofing panel is supported by the front surface of the second batten. The hook of the first roofing panel engages the second batten so as to secure the first roofing panel to the second batten. Further, the upper edge of the first roofing panel engages the spring and is urged downward by the spring so as to maintain the engagement of the hook of the first roofing panel with the second batten.

Figure 7:
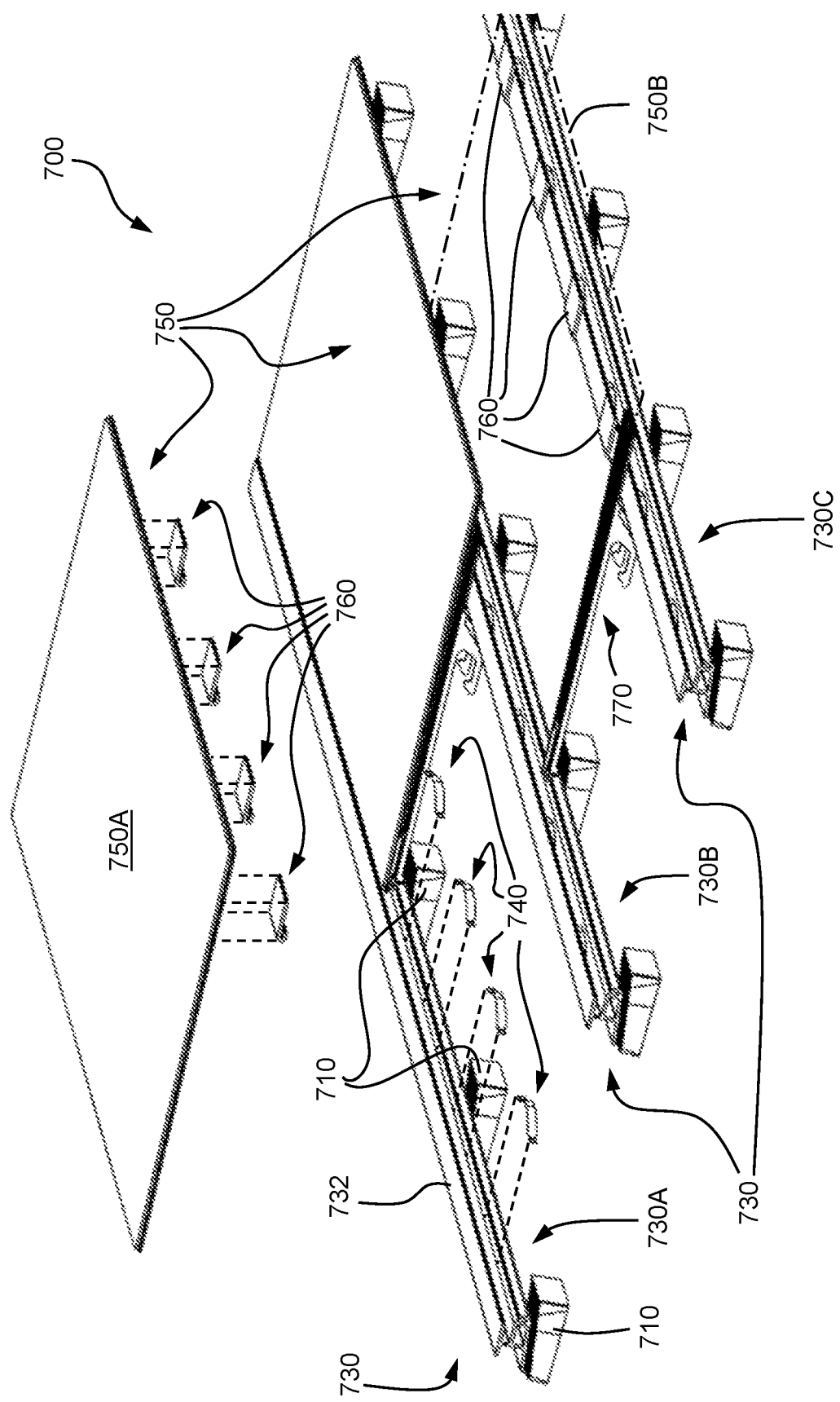
FIG. 7 is a partially exploded schematic perspective view of a roofing system according to an embodiment of the disclosure.

Such a roofing system is shown in a partially exploded view in FIG. 7. Roofing system 700 includes a plurality of battens 730 including a first batten 730A, a second batten 730B and a third batten 730C. The battens 730 support roofing panels 750 that form a visible surface of the roof. Springs 740 are configured to be positioned between the battens 730 and roofing panels 750 so as to engage an upper edge of a roofing panel 750, as explained further below. In FIG. 7, dashed lines illustrate the location of the springs 740 with respect to the body 732 of first batten 730A upon assembly of the roofing system 700.

A first roofing panel 750A is shown in FIG. 7 above the first batten 730A and second batten 730B for illustration. Upon installation, the first roofing panel 750A is supported by first batten 730A and second batten 730B. Each of the roofing panels 750 includes a group of hooks 760 on a rear surface thereof. Hooks 760 open in a downward direction so as to engage one of the battens 730, as explained further below. The hooks 760 of first roofing panel 750A are shown separated from the panel body with dashed lines indicating the installed location of the hooks on the rear surface of the panel body. A second roofing panel 750B is also shown in FIG. 7 with the panel body represented by an outer dashed line. Accordingly, the hooks 760 of second panel 750B are visible and can be seen engaging third batten 730C.

Figure 8A:
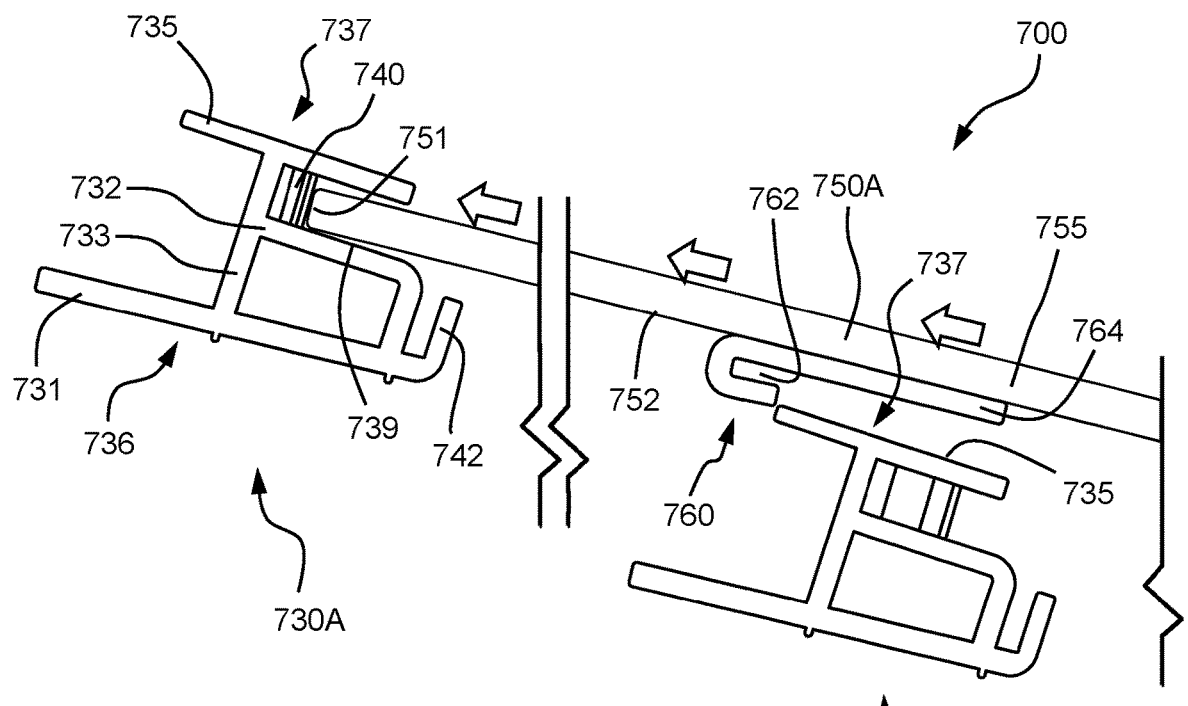
FIG. 8A is a schematic side view of a portion of the roofing system of FIG. 7 during installation.
Figure 8B:
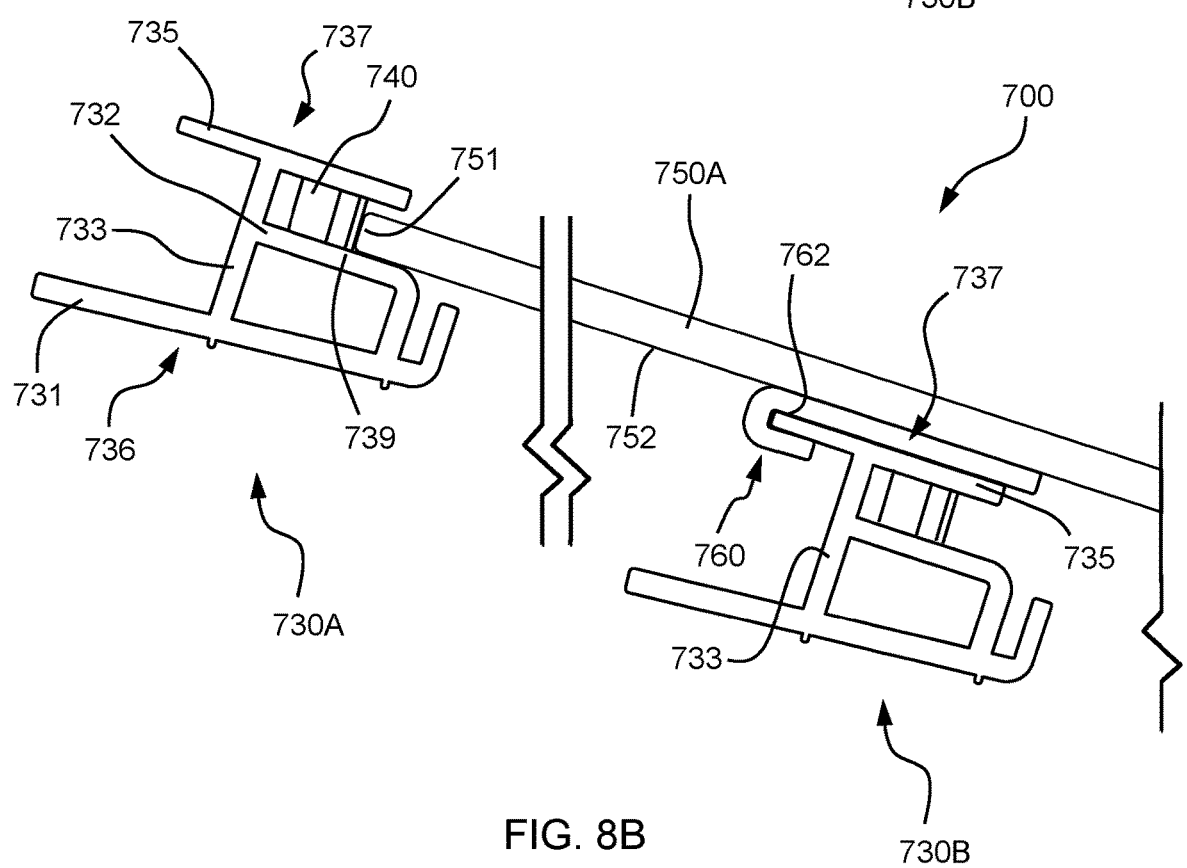
FIG. 8B is a schematic side view of a portion of the roofing system of FIG. 7 upon installation.

FIGS. 8A and 8B show a side view of a portion of roofing system 700 including first batten 730A, second batten 730B and first roofing panel 750A. FIG. 8A shows first roofing panel 750A during installation on the battens 730A, 730B and FIG. 8B shows first roofing panel 750A in an installed position. As illustrated with respect to batten 730A, each of the battens 730A, 730B includes a body 732 including a mounting base 731 that forms a rear surface 736 of the batten and a support platform 735 that forms a front surface 737 of the batten. Support platform 735 is configured to provide support for a lower portion of a roofing panel. For example, as shown in FIG. 8B, the lower portion of first roofing panel 750A rests on the support platform 735 of second batten 730B. The body 732 also includes a support ledge 739 that is disposed behind the front surface 737. Support ledge 739 is configured to support an upper portion of a roofing panel. For example, as shown in FIG. 8B, the upper portion of first roofing panel 750A rests on support ledge 739.

A spring 740 is disposed at an upper end of the support ledge 739 of the first batten 730A. Moreover, the first roofing panel 750A includes a hook 760 extending from a rear surface 752 thereof. Spring 740 on support ledge 739 of first batten 730A and hook 760 cooperate to hold first roofing panel 750A in place on the battens 730A, 730B. For example, as shown in FIG. 8A, when first roofing panel 750A is installed on the battens 730A, 730B, it is initially positioned so that an upper edge 751 of first roofing panel 750A engages spring 740. First roofing panel 750A is then pushed upward to compress spring 740 in order to allow hook 760 to pass the front surface 737 of second batten 730B. Once hook 760 passes front surface 737 of second batten 730B, as shown in FIG. 8A, first roofing panel 750A may be pushed rearward to engage second batten 730B. As shown in FIG. 8B, roofing panel 750A may then be lowered by the force of the spring 740 so that the hook 760 of first roofing panel 750A engages with second batten 730B.

In certain embodiments of the roofing system as otherwise described herein, the spring forms part of the first batten. For example, in some embodiments, each of the battens has one or more springs that are attached to the body of the batten. Such a configuration provides the springs in the appropriate location on the batten without the need to separately install the springs. In other embodiments, the springs may be separate from the battens and arranged on the batten during installation.

In some embodiments, the first batten is supported by a first group of riser blocks aligned in a first row. For example, as shown in FIG. 7, roofing system 700 includes a plurality of riser blocks 710 that are arranged in rows that support the battens 730. In various embodiments of the roofing system the riser blocks may include any of the features described above.

In certain embodiments of the roofing system as otherwise described herein, the support platform and support ledge form a slot, and the spring is disposed within the slot. For example, as shown in FIGS. 8A and 8B, support platform 735 extends over support ledge 739 such that a slot is formed between support platform 735 and support ledge 739. The slot extends upward to a central wall 733 of the body 732 that extends from the support platform 735 to the mounting base 731. Spring 740 is positioned at the upper end of slot 738 and secured against central wall 733.

Figure 9:
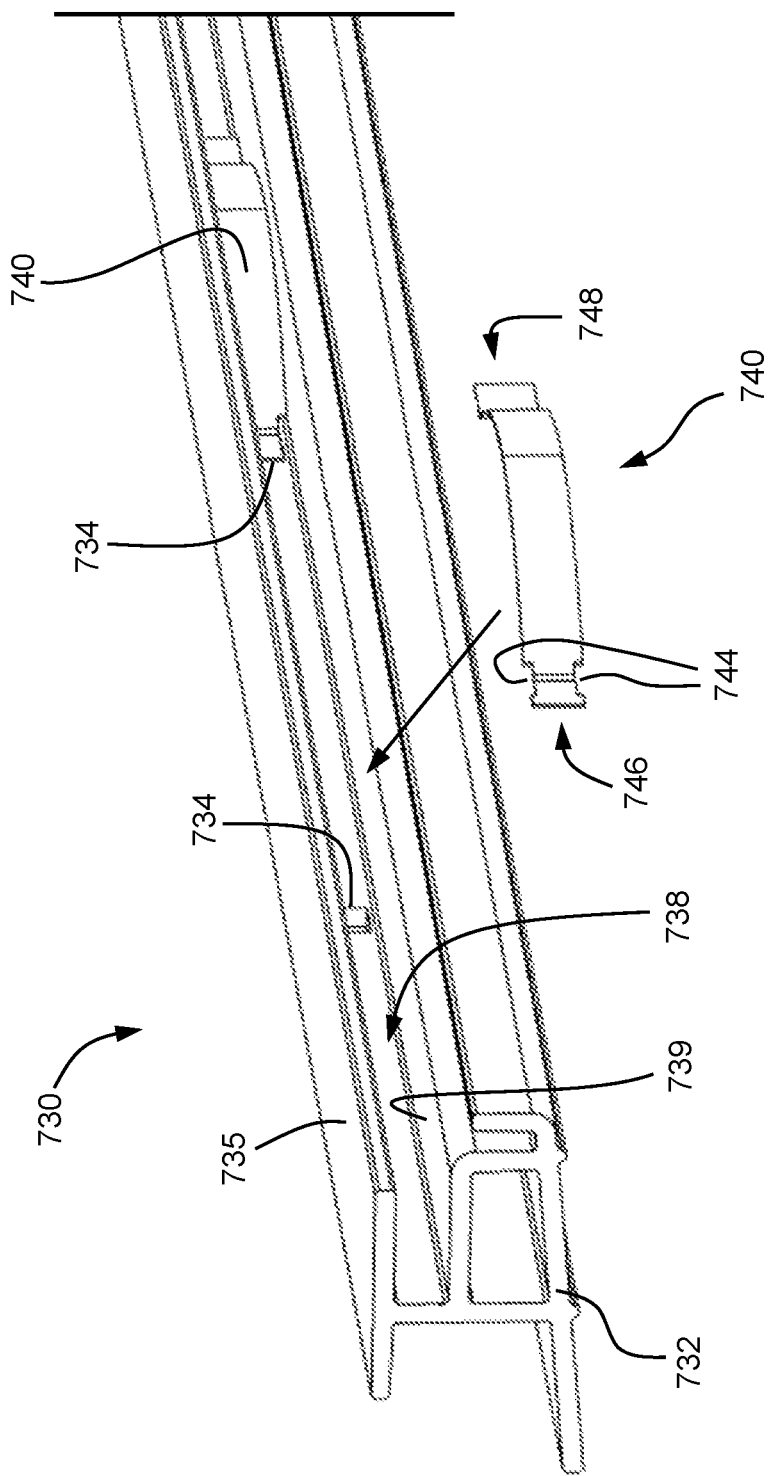
FIG. 9 is a partially exploded schematic perspective view of a portion of the roofing system of FIG. 7.

FIG. 9 shows a schematic perspective view of a section of a batten 730 with two springs 740. The spring 740 on the right is disposed within slot 738 between support platform 735 and support ledge 739. The spring 740 on the left is shown removed from the body 732 of batten 730 to show details of spring 740 and its connection to body 732, as explained further below.

In certain embodiments of the roofing system as otherwise described herein, the spring is a leaf spring. For example, each of the springs 740 on batten 730 in FIG. 9 is configured as a leaf spring that is formed of a strip of material that is curved in a single arc. When a roofing panel contacts spring 740, as shown in FIG. 8A, the curve of spring 740 is flattened and the spring exerts a force against the roofing panel. In some embodiments, the leaf spring includes a single leaf, with the configuration of a plate spring, as shown in FIG. 9. In other embodiments, the spring includes multiple leaves. Still in other embodiments, the spring has another form, such as a wave spring, helical spring, conical spring, torsion sprint, or other configuration.

In certain embodiments of the roofing system as otherwise described herein, the spring comprises at least one of: steel, hardened steel, bronze, titanium, copper alloy, or nickel alloy. In other embodiments, the spring is formed of another material, such as another metal, plastic, or a plant-based material. For example, in some embodiments, the spring is a leaf spring formed of a hard plastic material. In other embodiments, the spring has another form. For example, in some embodiments, the spring is formed from a compressible material, and has a bumper or similar configuration.

In certain embodiments of the roofing system as otherwise described herein, the stroke of the spring is greater than a length of an opening of the hook of the roofing panel. For example, as shown in FIG. 8A, hook 760 of first roofing panel 750A includes a downward-facing opening 762 that receives part of second batten 730B. The length of this opening 762 is smaller than the stroke length of spring 740, such that spring 740 maintains a force against first roofing panel 750A when the second batten 730B is fully inserted into opening 762 of hook 760. In some embodiments, the stroke of the spring is at least 120% of the length of the opening of the hook, which can help the spring maintain a substantial force on the roofing panel even when the hook is fully installed.

In certain embodiments of the roofing system as otherwise described herein, the body includes an aperture, and an end of the spring is secured in the aperture. For example, as shown in FIG. 9, body 732 of batten 730 includes an aperture 734 that receives spring 740. To hold spring 740 in aperture 734, the spring 740 includes notches 744 at one end that sit within aperture 734 to hold it in place. Spring 740 on the right is shown engaging the aperture 734 of body 732, while the spring 740 on the left is removed to illustrate the aperture 734 more clearly as well as the notches 744. In other embodiments, the body 732 includes a groove that extends along the length of the batten 730 that receives a portion of the spring. Further still, in some embodiments, the spring is fastened to the body using a fastener. For example, in some embodiments, an end of the spring is secured to the body of the batten using a screw, staple or nail.

In batten 730, the spring 740 is attached to body 732 at a single location at the first end 746 of spring 740. This configuration allows the second end 748 of spring 740 to move away from first end 746 when spring 740 is compressed. In other embodiments, the spring is connected to the body at more than one location. For example, in some embodiments, the spring is connected at both ends and compressing the spring simply flattens the arc. Still, in other embodiments, the spring has a more complex shape than a single minor arc, and folds as it is compressed. Other configurations and attachments are also possible.

In certain embodiments of the roofing system as otherwise described herein, the support platform is sloped with respect to the rear surface of the mounting base. For example, as shown in FIG. 8A, support platform 735 is sloped with respect to rear surface 736 of first batten 730A, with the lower side of support platform 735 being closer to rear surface 736 and the upper side of support platform 735 being further from rear surface 736. As a result, support platform 735 is at an increased angle compared to rear surface 736 of first batten 730A.

Similarly, in some embodiments, the support ledge is sloped with respect to the rear surface of the mounting base. For example, support ledge 739 is also sloped with respect to rear surface 736 of first batten 730 with the lower side of support ledge 739 being closed to the rear surface 736 than the upper side. The slope of the support platform and support ledge may allow the roofing panels to be supported at a slight angle so that they may overlap one another. Moreover, these slopes of the batten may also be used to cooperate with the slope of riser blocks that hold the batten, as explained above.

In certain embodiments of the roofing system as otherwise described herein, each batten includes an upwardly extending flange that fits in an opening of the hook. Further, in some embodiments, the flange is formed by an upper section of the support platform. For example, as shown in FIG. 8B, support platform 735 extends upward from central wall 733 to form a flange that is received in the opening 762 in hook 760. By receiving the flange formed by support platform 735, the hook 760 is securely engaged to second batten 730B.

In certain embodiments of the roofing system as otherwise described herein, the flange is tapered so as to narrow toward an upper distal end. Accordingly, the fit between the flange and the hook may tighten due to friction as the flange is inserted further into the opening of the hook. In other embodiments, the flange has a uniform thickness. Still, in other embodiments the flange includes ridges or protrusions that engage with the hook to form a snap or locking fit together.

Figure 10:
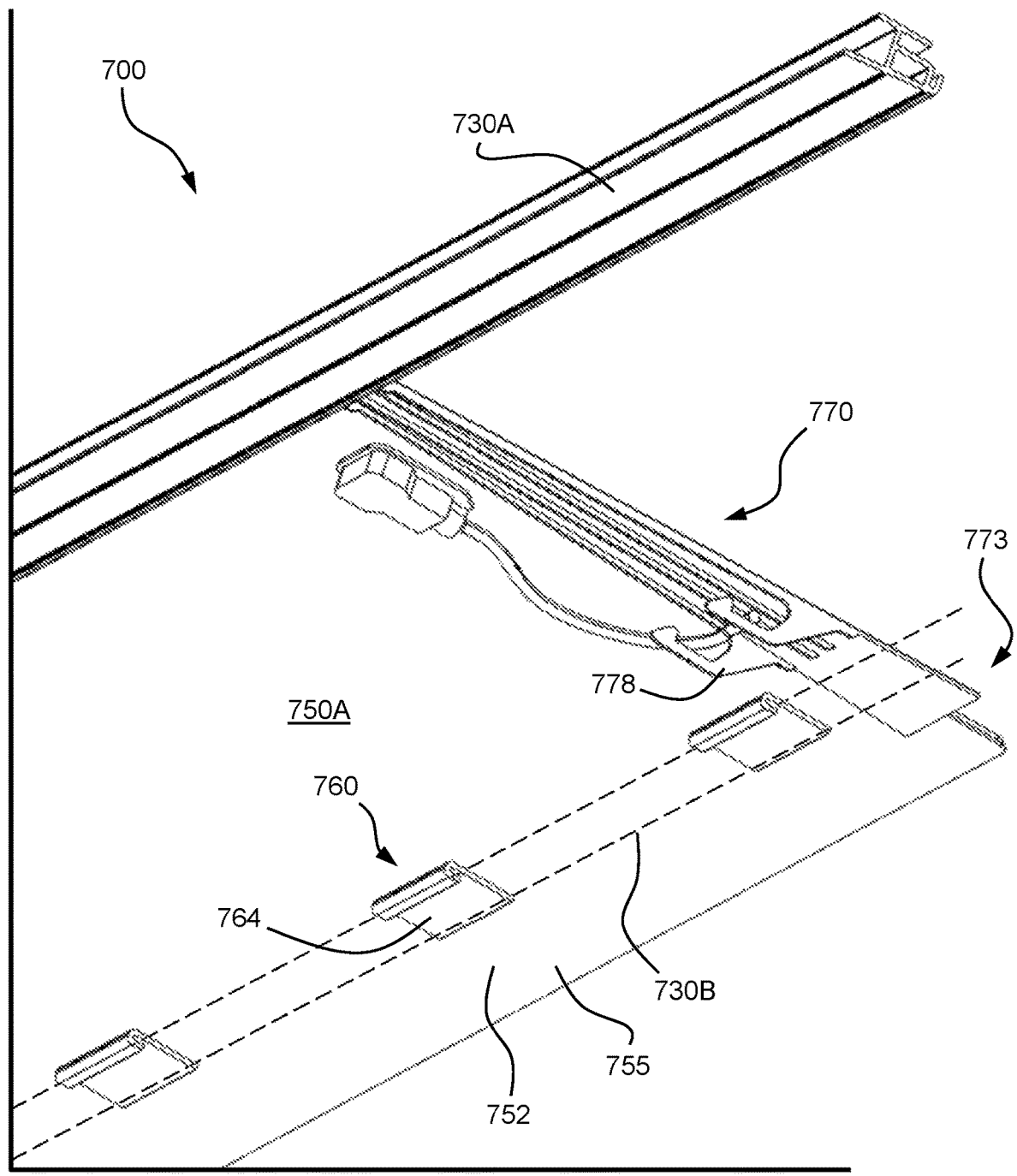
FIG. 10 is a schematic perspective rear view of a portion of the roofing system of FIG. 7.

In certain embodiments of the roofing system as otherwise described herein, the roofing panel includes a panel body and the hook is attached to the panel body. In some embodiments, the hook is formed on a base that is secured to the panel body. For example, as shown in FIG. 8A, hook 760 of first roofing panel 750A is formed on a base 764 that is secured to a rear surface of the panel body 755 of first roofing panel 750A. FIG. 10 shows a rear perspective view of a portion of roofing system 700 with first roofing panel 750A secured on a first batten 730A and second batten 730B. Second batten 730B is illustrated by dashed lines to prevent masking features of the first roofing panel 750A, such as the hooks 760. As shown, hooks 760 are formed on a base 764 that is secured to a rear surface 752 of panel body 755.

In other embodiments, the hook is integrally formed with the panel body. For example, in some embodiments, the hook is a cast or molded piece that is formed with the material that forms the rear surface of the panel body.

In certain embodiments of the roofing system as otherwise described herein, the base extends downward from the hook, so as to form a hook opening between the base and the hook. For example, as shown in FIGS. 8A and 10, base 764 extends down from hook 760, such that the opening 762 formed by hook 760 is positioned between hook 760 and base 764. As shown in FIG. 8B, when first roofing panel 750A is placed on second batten 730B, the base 764 is placed against the front surface 737 of second batten 730B and the panel body 755 of first roofing panel 750A is spaced from batten 730B. Accordingly, as shown in FIG. 10, in view of the spacing between hooks 760 along the length of the roofing panel, a small gap is provided between the panel body 755 and the front surface 737 of second batten 730B.

This space can be utilized for wires or other components, such as a drain channel, as described further below.

Figure 11:
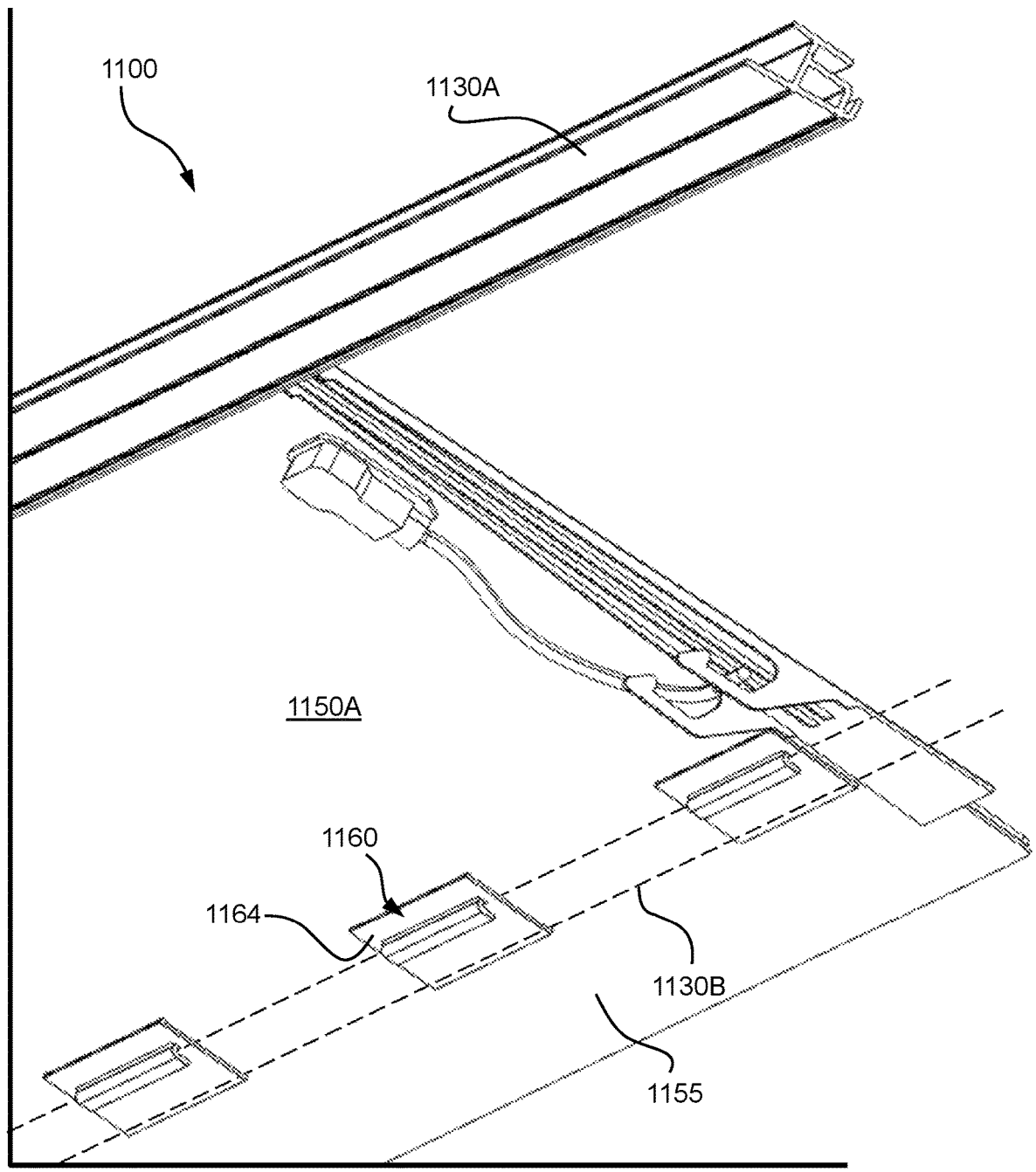
FIG. 11 is a schematic perspective rear view of a portion of a roofing system according to an embodiment of the disclosure.

In certain embodiments of the roofing system as otherwise described herein, the base extends upward from the hook. Such a roofing system is shown in FIG. 11. Roofing system 1100 includes a first roofing panel 1150A that is supported by a first batten 1130A and a second batten 1130B. Second batten 1130B is illustrated by dashed lines to prevent masking features of the first roofing panel 1150A, such as the hooks 1160. Hooks 1160 of the first roofing panel 1150A engage the second batten 1130B in order to hold the first roofing panel 1150A in place. The hooks 1160 are formed on a base 1164 that extends both upward and downward from hook 1160. Accordingly, base 1164 provides a large surface area for attachment to the panel body 1155 of first roofing panel 1150A.

In some embodiments, the base only extends upward from the hook. Accordingly, in such cases, the opening of the hook may be formed between the hook and the panel body, rather than between the hook and the base. Further still, in some embodiments, the base is formed as a frame of the panel that extends across the entire length and/or width of the panel.

In certain embodiments of the roofing system as otherwise described herein, the first batten includes feet configured to engage a front face of each riser block of the first group of riser blocks. For example, as shown in FIG. 4, first batten 130 includes feet 140 that engage front face 111 of riser block 110. In particular, feet 140 cooperate with protrusions 119 to stabilize first batten 130 on riser block 110 until first batten 130 is securely fastened.

In certain embodiments of the roofing system as otherwise described herein, an outer surface of the first batten is formed of a polymer material. For example, in some embodiments, the first batten is entirely formed of a polymer material. Further, in some embodiments the polymer material includes reinforcing fibers, such as a fiberglass material. In other embodiments, the first batten is formed of a first material with a polymer coating that forms the outer surface of the batten. For example, in some embodiments, the first batten is formed of a metal, such as aluminum, that is covered with a polymer coating, shell or overlay. The use of a polymer on the exterior surface of the batten can reduce the conductivity of the batten, which may help avoid requirements to electrically bond or ground the batten. In other embodiments, the first batten is formed from another insulating material, such as a wood, ceramic or composite material. Further, in some embodiments, the first batten is formed of a conductive material, such as metal. For example, in some embodiments, the first batten is formed of aluminum, steel or iron.

In certain embodiments of the roofing system as otherwise described herein, the first batten has a uniform cross section. For example, in some embodiments, the first batten is extruded along its length such that the cross-section of the batten is uniform. For example, in some embodiments, the first batten is an extruded polymer, a coextruded composite, or an extruded metal. Alternatively, in some embodiments, the first batten is formed by another method and may or may not include a uniform cross section. For example, in some embodiments, the first batten may include portions that do not extend along the entire length thereof. For example, in some embodiments, the batten includes a first clip portion with separate clip segments along the length of the batten. Likewise, in some embodiments, the first batten includes periodic feet along the length thereof, rather than feet that extend along the entire length of the first batten, as in first batten 130, shown in FIG. 4.

In certain embodiments of the roofing system as otherwise described herein, a length of the first batten is at least 2 feet, e.g., at least 3 feet, e.g., at least 6 feet. Further, in certain embodiments, of the roofing system as otherwise described herein, the length of the first batten is no more than 40 feet inches, e.g., no more than 30 feet, e.g., no more than 20 feet, e.g., no more than 12 feet. For example, in some embodiments, the length of the first batten is in a range from 3 feet to 40 feet, e.g., from 6 feet to 30 feet, e.g., from 4 feet to 12 feet.

In certain embodiments of the roofing system as otherwise described herein, the first group of roofing panels are solar panels. For example, in some embodiments, each of the roofing panels in the first group of roofing panels includes a panel body and photovoltaic elements disposed in the panel body. For example, in some embodiments, the roofing panel includes a glass panel body that incorporates photovoltaic elements. In other embodiments, the panel body is formed of a variety of materials that house the photovoltaic elements.

In certain embodiments of the roofing system as otherwise described herein, the roofing system further includes non-solar roofing panels. For example, in some embodiments, the roofing panels includes a mix of solar and non-solar panels. On the other hand, in some embodiments, all of the roofing panels are solar. Likewise, in some embodiments, all of the roofing panels are non-solar. For example, in some embodiments, the roofing panels are standard roofing panels without any electrical activity or connections. Further, in some embodiments, the roofing panels are formed of glass, metal, ceramic or a polymer material.

Figure 6:
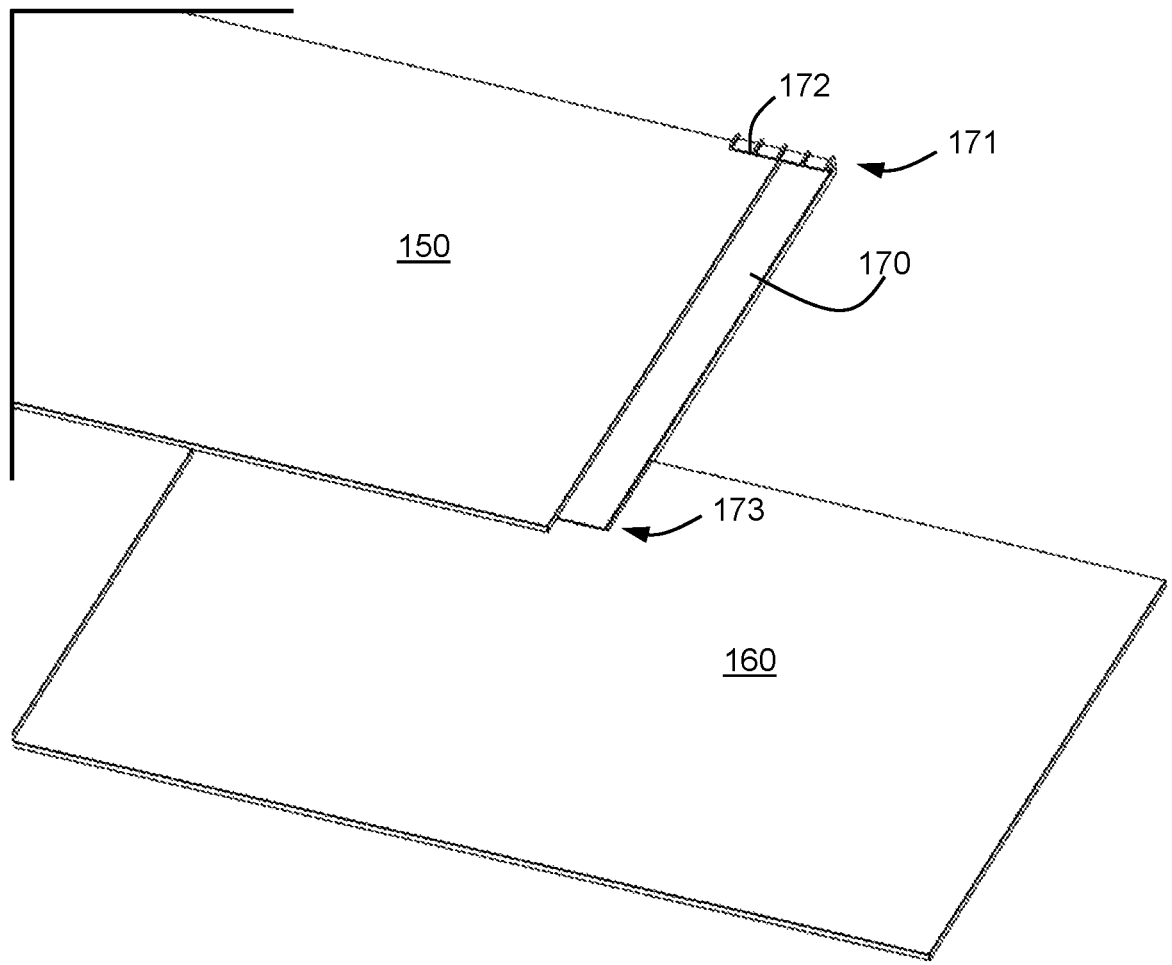

In certain embodiments of the roofing system as otherwise described herein, the roofing system further includes drain channels disposed between adjacent pairs of the roofing panels in the first group of roofing panels. Such a drain channel 170 is shown in FIG. 6 along an edge of roofing panel 150. Drain channel 170 is positioned under the lateral edge of roofing panel 150 and captures water that runs off the edge. Accordingly, drain channel 170 can direct the water down the slope of the roof and onto the front surface of the lower roofing panel 160. Accordingly, water is hindered from dripping through the gaps between roofing panels onto the surface structure.

In certain embodiments of the roofing system as otherwise described herein, each drain channel includes a hook at an upper end of the drain channel that is secured to an upper edge of an associated roofing panel. For example, drain channel 170 shown in FIG. 6 includes an upper end 171 and a hook 172 positioned at upper end 171 that couples to the upper edge of roofing panel 150. While drain channel 170 in FIG. 6 is shown extending laterally outward from the side edge of roofing panel 150, this overhanging section of drain channel 170 is configured to sit behind a neighboring roofing panel and catch additional runoff from the neighboring roofing panel.

In certain embodiments of the roofing system as otherwise described herein, a lower end of each drain channel extends over a roofing panel in a second row of roofing panels. For example, drain channel 170 includes a lower end 173 that is positioned over the lower roofing panel 160. As explained above, this allows water that flows over the side of roofing panel to be directed onto the front surface of another roofing panel, rather than onto the surface structure.

Figure 12A:
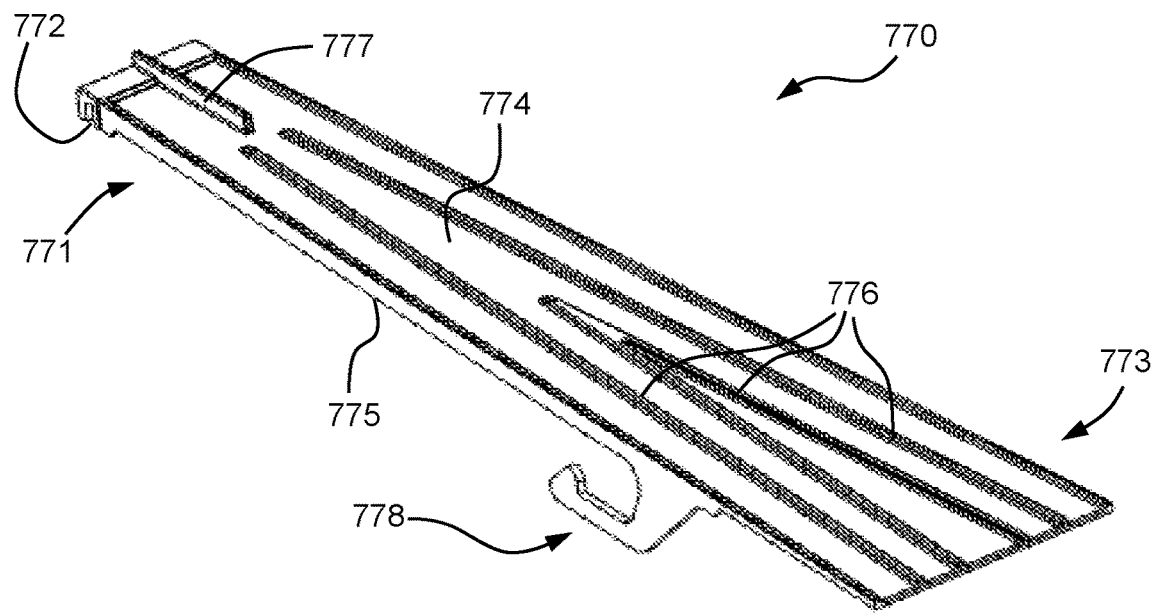
FIG. 12A is a schematic perspective view of a drain channel of the roofing system of FIG. 7.
Figure 12B:
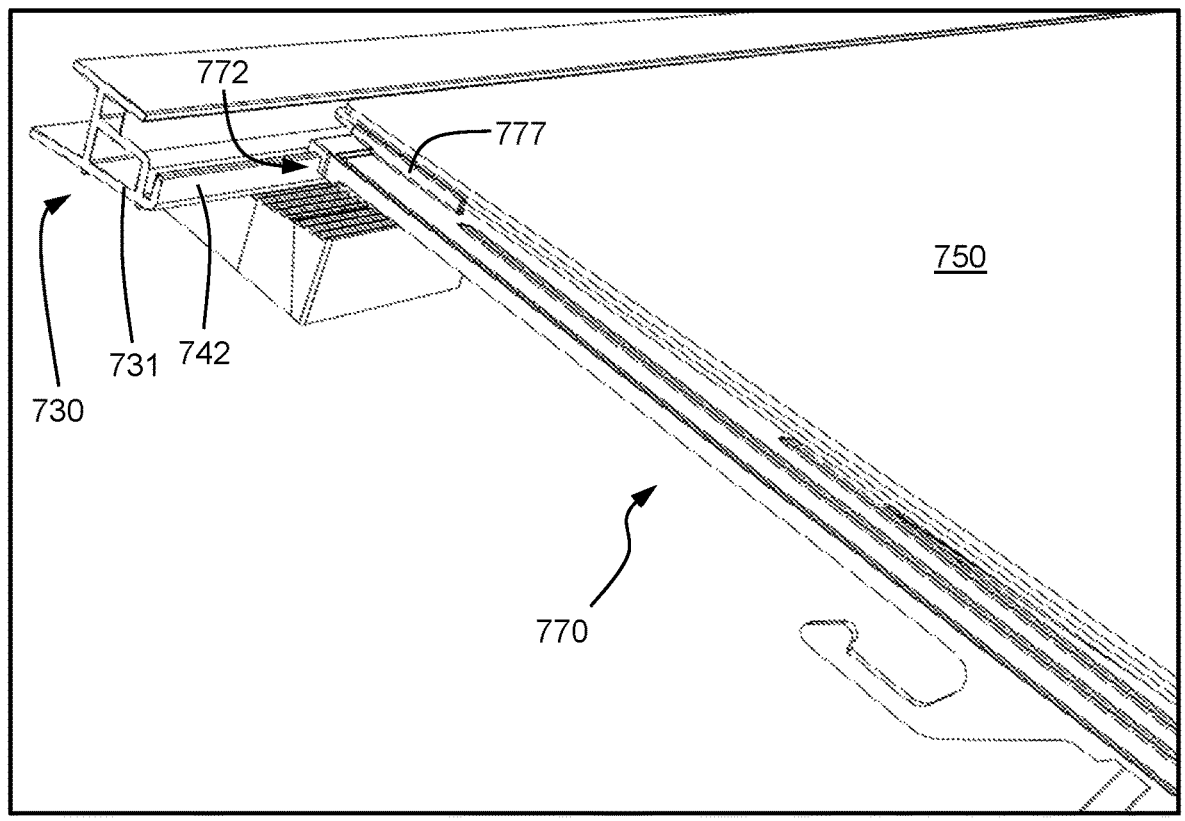
FIG. 12B is a schematic perspective view of a portion of the roofing system of FIG. 7 that shows the drain channel of FIG. 12A.

Another drain channel 770 is included in roofing system 700, shown in FIG. 7. FIG. 12A shows a detailed perspective view of drain channel 770 and FIG. 12B shows drain channel 770 secured to a batten 730 and disposed under a roofing panel 750. A rear view of drain channel 770 is also shown in FIG. 10, where drain channel 770 is positioned under a side edge of first roofing panel 750A.

In certain embodiments of the roofing system as otherwise described herein, the drain channel includes an upper end, a lower end, a front surface, and a rear surface, and the front surface includes a plurality of ridges so as to form a grooved surface. For example, as shown in FIG. 12A, drain channel 770 includes an upper end 771, a lower end 773, a front surface 774 and a rear surface 775. The front surface 774 includes a plurality of ridges 776 extending along the length of the drain channel 770. The ridges 776 form corresponding grooves that extend from the upper end 771 to the lower end 773. In addition to helping direct water flow down the front surface 774 of drain channel 770, these ridges 776 also help to add structural stability to drain channel 770.

In certain embodiments of the roofing system as otherwise described herein, the plurality of ridges includes a divider ridge that is positioned along the side edge of the roofing panel. For example, as shown in FIG. 12A, drain channel 770 includes a divider ridge 777 at the upper end 771 that is positioned in the middle of front surface 774. The divider ridge 777 is configured to be positioned between two roofing panels so as to space the roofing panels apart, thereby allowing water to flow over the edges and onto drain channel 770. For example, FIG. 12B, shows a roofing panel 750 positioned over one side of drain channel 770 and up against divider ridge 777.

In certain embodiments of the roofing system as otherwise described herein, the drain channel tapers outward from the upper end to the lower end. For example, as shown in FIG. 12A, drain channel 770 is shaped as an isosceles trapezoid and tapers outward from upper end 771 to lower end 773. Likewise, the ridges 776 are angled slightly outward toward lower end 773. Accordingly, when drain channel 770 is positioned to overlap a lower roofing panel it will spread water across the surface of the lower roofing panel. This may help prevent streaking on the surface of the lower roofing panel.

In certain embodiments of the roofing system as otherwise described herein, the drain channel includes a hanger extending behind the rear surface. For example, as shown in FIG. 12A, drain channel 770 includes a hanger 778 in the form of a hook that extends behind rear surface 775. As illustrated in FIG. 10, hanger 778 of drain channel 770 may be used to hold wires or cables of the roofing system. This provides a convenient cable management configuration and can help keep the cables off the underlying surface structure.

In certain embodiments of the roofing system as otherwise described herein, the lower end of the drain channel is positioned between the front surface of the second batten and a rear surface of the first roofing panel. For example, as explained above and illustrated in FIG. 10, the base 764 secured to each hook 760 contacts the batten 730B, thereby providing a gap between the batten 730B and the panel body 755 of first roofing panel 750A. The drain channel 770 may be positioned so that the lower end 773 sits within this gap between the batten 730B and the rear surface of the roofing panel.

In certain embodiments of the roofing system as otherwise described herein, the upper end of the drain channel includes a socket that fits onto the first batten. For example, as shown in FIG. 12A, drain channel 770 includes a rearward facing socket 772 that provides a space for receiving part of the batten. For example, as shown in FIG. 12B, drain channel 770 is positioned with the socket 772 placed onto part of batten 730.

In certain embodiments of the roofing system as otherwise described herein, the first batten includes a forwardly extending mounting arm disposed on a lower side of the first batten that fits into the socket of the drain channel. For example, as shown in FIG. 12B, batten 730 includes a mounting arm 742 that extends from the mounting base 731 at the lower side of the batten. The mounting arm 742 provides a lip for the socket 772 of drain channel 770 to engage in order to secure drain channel 770 to batten 730. In other embodiments, the drain channel may secure to a different portion of the batten.

In certain embodiments of the roofing system as otherwise described herein, a distal end of the mounting arm is disposed behind the support ledge. For example, as shown with respect to first batten 730A in FIG. 8A, the front surface of support ledge 739 is positioned in front of the distal end of mounting arm 742. Accordingly, a drain channel is able to fit within the space between the front edge of the mounting arm and a roofing panel that is resting on the support ledge.

In certain embodiments of the roofing system as otherwise described herein, the roofing system further includes a second group of riser blocks of the plurality of riser blocks, where the second group of riser blocks is aligned in a second row, a second batten extends along the second row and is supported by the second group of riser blocks, and a second group of roofing panels disposed along the second row and supported by the second batten. For example, as shown in FIG. 1, roofing system 100 further includes a second group of riser blocks aligned in a second row. A second batten extends along the second row and is supported by the second group of riser blocks. Further, and a second group of roofing panels is disposed along the second row and is supported by the second batten.

In certain embodiments of the roofing system as otherwise described herein, each of the roofing panels of the second group of roofing panels includes an upper edge that is supported by the first batten. For example, as shown in FIG. 2, a lower roofing panel 160 that is part of a second row of roofing panels is positioned with an upper edge that is supported by first batten 130. Specifically, the upper edge of lower roofing panel 160 rests on the support ledge 139 of first batten 130.

In another aspect, the disclosure provides a method of installing a roofing system of the disclosure that includes a roofing panel with a clip portion. The method includes positioning the first batten on the first group of riser blocks and securing the first group of roofing panels to the first batten by coupling the second clip portion of each roofing panel to the first clip portion of the first batten. For example, as shown in FIG. 1, the riser blocks and battens are positioned on the surface structure 102 of the roof so that the first batten 130 is supported by a group of riser blocks 110 arranged in a row 114. Roofing panels are then placed along the row and, as shown in FIG. 2, the second clip portion 154 of roofing panel 150 is secured to first clip portion 134 of first batten 130.

In another aspect, the disclosure provides a method of installing a roofing system of the disclosure that includes a roofing panel with a hook. The method includes positioning a first batten and a second batten over a surface structure and providing a spring on a support ledge of the first batten. An upper edge of a first roofing panel is positioned against the spring on the first batten. The spring is compressed such that a hook of the first roofing panel is positioned above part of the second batten. The hook of the first roofing panel is then positioned to engage the second batten. Such a method is shown in FIGS. 8A and 8B. For example, as shown in FIG. 8A, first roofing panel 750A is initially positioned so that is upper edge 751 engages the spring 740 on first batten 730A. First roofing panel 750A is then pushed upward to compress spring 740 so that hook 760 passes the front surface 737 of second batten 730B. First roofing panel 750A may then be pushed rearward to engage second batten 730B. To engage hook 760, as shown in FIG. 8B, roofing panel 750A may then be lowered by the force of the spring 740 on first batten 730A so that the hook 760 receives part of the second batten 730B.

In certain embodiments, positioning the first batten over the surface structure includes positioning the first batten on a first group of riser blocks. For example, as shown in FIG. 7, first batten 730A is positioned on several riser blocks 710 that are arranged in a row.

In certain embodiments of the method as otherwise described herein, the method also includes securing the first batten and riser blocks to the surface structure using mechanical fasteners, where each mechanical fastener passes through the first batten and a respective riser block. For example, as shown in FIG. 2, a nail 118 or other mechanical fastener is used to extend through first batten 130, through riser block 110, and into surface structure 102 so as to hold the roofing system onto the surface structure.

The riser blocks and battens may be placed on the surface structure in various different sequences to place these components in the desired locations. In some embodiments, all the riser blocks in the first group of riser blocks are first placed on the surface structure, and then the first batten is disposed over the riser blocks. In other embodiments, the first batten is positioned in place once there are enough riser blocks to support the first batten, and then the additional riser blocks are inserted under the first batten. For example, in some embodiments, the first batten is initially supported at a first end by a first riser block and at a second end by a second riser block. Additional riser blocks are then positioned under the first batten to provide added support along the length of the batten before the weight of the roofing panels is added.

In certain embodiments of the method as otherwise described herein, positioning the first batten on the first group of riser blocks includes adjusting a position of the riser blocks along the length of the first batten so as to place each riser block over a respective framing member of the surface structure. For example, in some embodiments, the riser blocks are spaced across the roof so as to be aligned with framing members, such as rafters, of the underlying roof surface structure. Accordingly, the load on the roof can be directly transferred to the roof frame.

In certain embodiments of the method as otherwise described herein, positioning the first batten on the first group of riser blocks includes adjusting a position of a first selected riser block to a first height with respect to a slope of the surface structure so as to place a front face of the first selected riser block against the first batten. For example, in some embodiments, rather than positioning all the riser blocks in a straight line across the roof surface structure, the position of the riser blocks with respect to the slope of the roof, i.e., the height of the riser blocks, can be based on where the front surface of the riser block meets the batten. Accordingly, where the riser blocks include an angled front face, the first batten will engage some of the riser blocks where the depth of the riser blocks is greater and will engage some of the riser blocks where the depth of the riser blocks is smaller. This allows the riser blocks to be used to accommodate warping and deformations in the surface structure. As a result, some embodiments include adjusting a position of a second selected riser block to a second height with respect to the slope of the surface structure that is different than the height of the first selected riser block In certain embodiments of the method as otherwise described herein, the method also includes separating each of the riser blocks from a collection of riser blocks that are held together. For example, in some embodiments, the riser blocks are held together in a collection that a builder carries onto the roof surface structure during installation of the roofing system. This keeps the riser blocks together in a group until they are installed, thereby helping to avoid misplacement of any of the riser blocks. For example, in some embodiments the riser blocks are connected by a tether. Upon installation, the riser blocks may either be removed from the tether, either by disconnecting the riser blocks or cutting the tether, or may be separated along the length of the tether for placement on the surface structure.

In other embodiments, the riser blocks are molded components that are connected to each other on a common sprue from the molding process. Upon installation, the riser blocks can be disconnected from the sprue and placed on the surface structure of the roof. Further still, in other embodiments, the riser blocks formed to nest and the collection of riser blocks is stacked. Again, upon installation the riser blocks can be removed from the stack for placement on the surface structure of the roof. Such a stack of riser blocks can be held by a carrier, such as a cartridge in which the riser blocks are stored, or a shaft or cable that extends through the stack of riser blocks, for example through the slot 117 shown in FIG. 3.

In certain embodiments of the method as otherwise described herein, the method also includes placing an upper edge of each roofing panel on a support ledge of a second batten. Further, in some embodiments, the upper edge of each roofing panel is placed on the support ledge of the second batten before securing the roofing panels to the first batten. For example, in some embodiments, the upper edge of a roofing panel is inserted into the space between support ledge 139 and support platform 135, as shown in FIG. 4. For example, the upper edge of second roofing panel 160, as shown in FIG. 2, is positioned in this location. Once the upper edge of the roofing panel is in place, the second clip portion of the roofing panel may be coupled to the first clip portion of another batten that is placed lower on the roof surface structure.

In another aspect the disclosure provides another roofing system that includes a first roofing panel that is supported by a first support bracket. The first roofing panel includes an upper edge, a lower edge, a first side edge, and a second side edge. The first support bracket is disposed on a roof surface structure and includes a front surface that supports the first roofing panel. The first support bracket also includes first and second legs extending rearward from the front surface and holding the front surface at a distance from the surface structure. A lower hook is disposed at a lower end of the front surface and holds the lower edge of the first roofing panel. A spring is disposed at an upper end of the front surface and engages the upper edge of the first roofing panel so as to maintain the first roofing panel in the lower hook.

Figure 13:
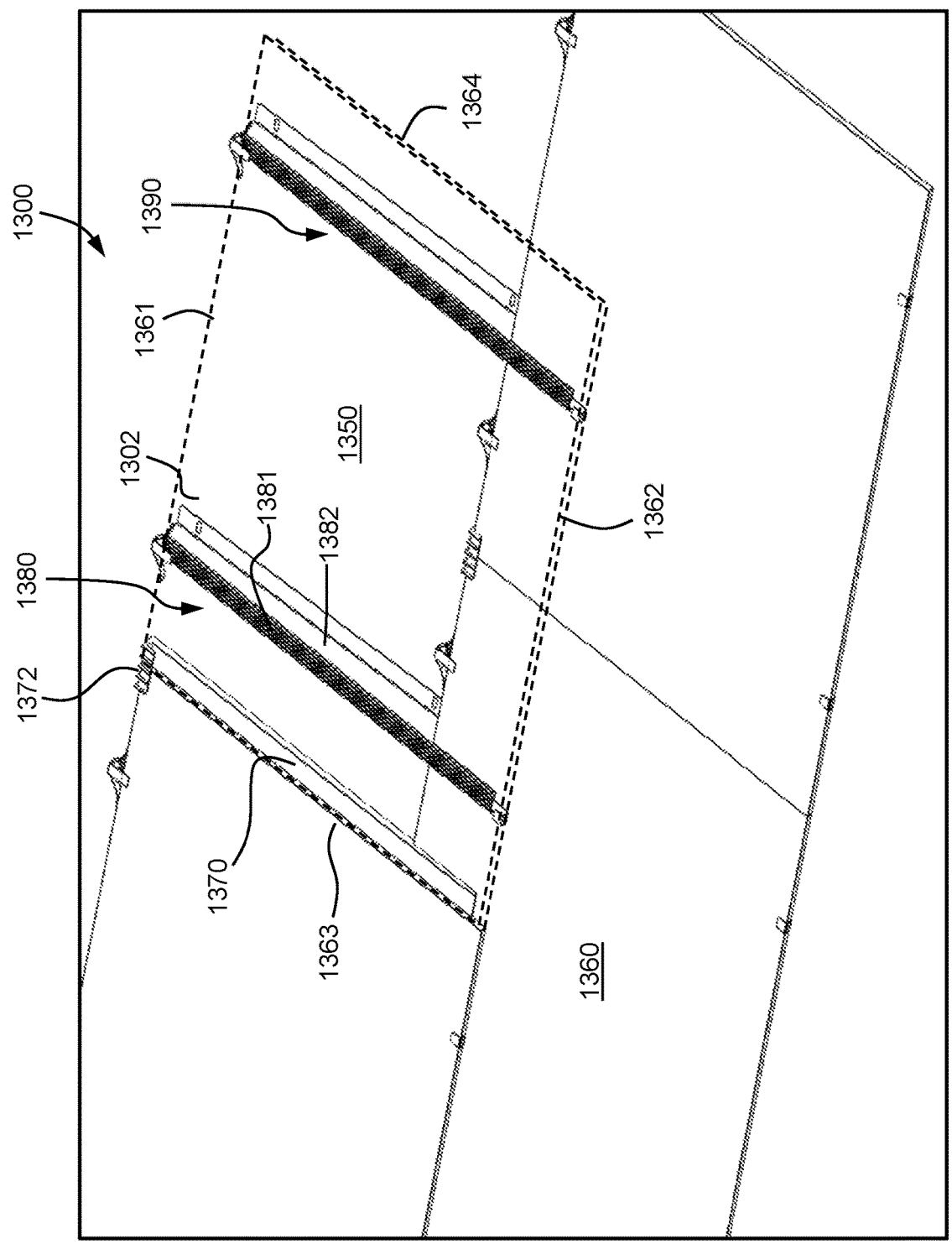
FIG. 13 is a schematic perspective view of a roofing system according to another embodiment of the disclosure.

Such a roofing system is shown in FIG. 13. Roofing system 1300 includes a first roofing panel 1350 that is supported by a first support bracket 1380 mounted on a surface structure 1302. First roofing panel 1350 is illustrated with a dashed outline and transparent face so as not to obscure other portions of roofing system 1300. First roofing panel 1350 includes an upper edge 1361, a lower edge 1362, a first side edge 1363, and a second side edge 1364. First support bracket 1380 includes a front surface 1381 that supports the first roofing panel 1350. Front surface 1381 is held at a distance from surface structure 1302 by first and second legs 1382 that extend rearward from front surface 1381 along the sides of first bracket 1380. First and second legs 1382 also allow the first roofing panel 1350 to be spaced from surface structure 1302. As explained above, the space between the roofing panels 1350 and the surface structure 1302 can be utilized to house components of the roof system, route wires, and provides additional drainage for the roofing system.

Figure 14:
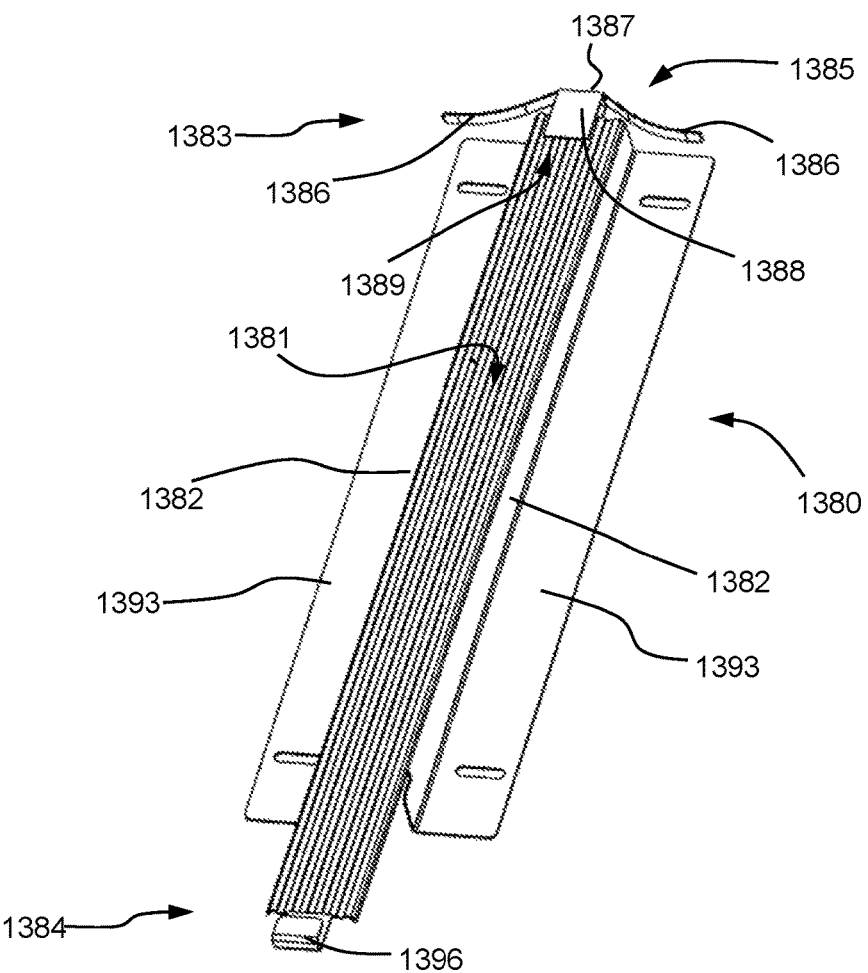
FIG. 14 is a schematic top perspective view of a bracket of the roofing system of FIG.
Figure 15:
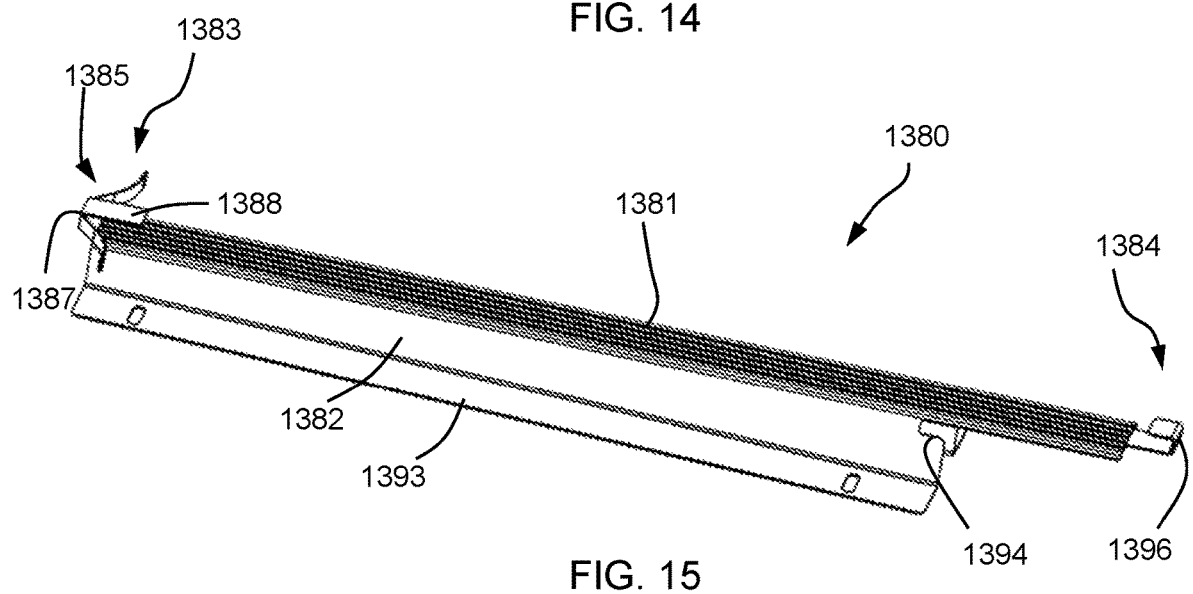
FIG. 15 is a schematic side perspective view of the bracket of FIG. 14.

As shown in FIGS. 14 and 15, first support bracket 1380 also includes an upper end 1383 and a lower end 1384. A lower hook 1396 is disposed at the lower end 1384 and is configured to hold the lower edge of a roofing panel. A spring 1385 is disposed at the upper end 1383 of first support bracket 1380. Spring 1385 includes two spring arms 1386 that extend from an upper flange 1387 and are configured to impart a spring force to a roofing panel held in the bracket. Accordingly, spring 1385 helps to maintain a roofing panel in the lower hook 1396 at the lower end 1384 of first support bracket 1380.

In certain embodiments of the roofing system as otherwise described herein, the upper flange is part of an upper hook that extends over the upper edge of the first roofing panel. For example, a tab 1388 extends down from upper flange 1387 to form an upper hook 1389 that is configured to extend over the upper edge of the roofing panel.

In certain embodiments of the roofing system as otherwise described herein, each leg includes a foot that is secured to the surface structure. For example, as shown in FIG. 14, each leg 1382 extending rearward from front surface 1381 includes a foot 1393 extending laterally outward that provides a surface of the first support bracket 1380 that can be coupled to the surface structure. For example, feet 1393 each include slots for receiving mechanical fasteners that can be used to attach first support bracket 1380 to the underlying surface structure.

In certain embodiments of the roofing system as otherwise described herein, the front surface extends lower than the first and second legs. For example, as shown in FIGS. 14 and 15, the first and second legs 1382 do not extend to the lower end 1384 of first support bracket 1380. Accordingly, the lower portion of front surface 1381 extends past the legs 1382 and is suspended at a distanced spaced from the surface structure. This configuration allows the lower end of front surface 1381, and the lower part of any roofing panel supported by first support bracket 1380 to extend over a roofing panel in a lower row of roofing panels.

In certain embodiments of the roofing system as otherwise described herein, each of the first and second legs includes a slot that receives a second roofing panel that extends under the lower edge of the of the first roofing panel and the lower end of the front surface of the first support bracket. For example, as shown in FIG. 15, leg 1382 includes a slot 1394 at its lower end that is configured to receive a roofing panel in a lower of roofing panels. Such a roofing panel can fit into the slot 1394 to support the upper edge of the lower roofing panel and allow the lower edge of the upper roofing panel to extend over the lower roofing panel without obstruction.

In certain embodiments of the roofing system as otherwise described herein, the roofing system also includes a first drain channel disposed along the first edge of the first roofing panel. For example, as shown in FIG. 13, roofing system 1300 includes a first drain channel 1370 disposed along first side edge 1363 of the first roofing panel 1350. The position of first drain channel 1370 under first side edge 1363 of roofing panel 1350 allows first drain channel 1370 to capture water that runs off the first side edge 1363. Accordingly, drain channel 1370 can direct the water down the slope of the roof and onto the front surface of a roofing panel in a lower row of roofing panels. Accordingly, water is hindered from dripping through the gaps between roofing panels onto the surface structure.

In certain embodiments of the roofing system as otherwise described herein, the first drain channel includes a first hook at an upper end that extends over the upper edge of the first roofing panel. the first drain channel includes a first hook at an upper end that extends over the upper edge of the first roofing panel. For example, drain channel 1370 shown in FIG. 13 includes a first hook 1372 positioned at its upper end that couples to the upper edge 1361 of roofing panel 1350.

In certain embodiments of the roofing system as otherwise described herein, a lower end of the first drain channel is supported by a lower roofing panel that extends under the first roofing panel. For example, as shown in FIG. 13, first drain channel 1370 is supported by a lower roofing panel 1360 that extends under first roofing panel 1350.

In certain embodiments of the roofing system as otherwise described herein, the first drain channel is unattached to the surface structure. For example, drain channel 1370 of roofing system 1300, as shown in FIG. 13 is unattached to surface structure 1302. Rather than being supported by the surface structure, drain channel 1370 is supported by roofing panel 1350 at its upper end using first hook 1372 and by roofing panel 1360 at its lower end. In other embodiments, the first drain channel is supported by legs. For example, in some examples the drain channel has a similar configuration to the support bracket, but is positioned to provide drainage rather than structural support. For example, in some embodiments, the support brackets and drain channels of the roofing system have the same configuration, but the support brackets are positioned to bear the load of the roofing system, such as by connecting to framing members, while the drain channels are positioned between gaps in the roofing systems.

Figure 16:
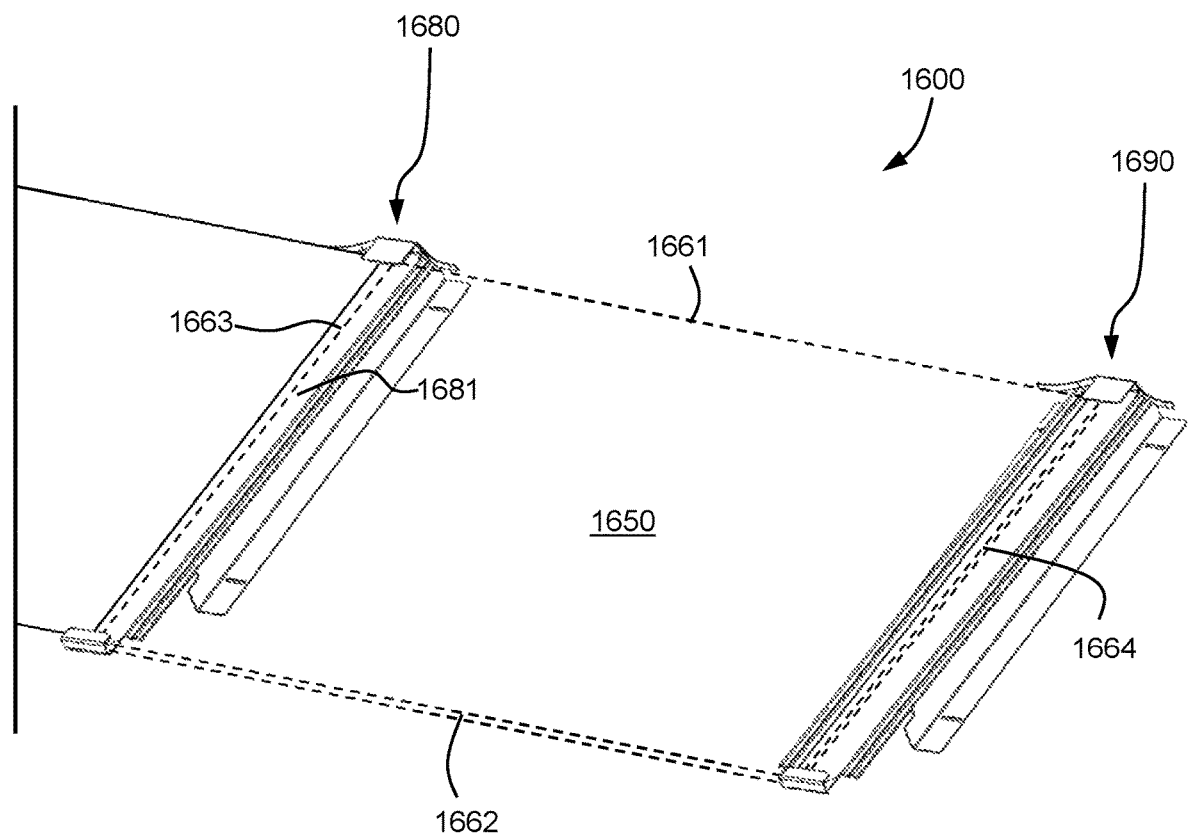
FIG. 16 is a schematic perspective view of a roofing system according to another embodiment of the disclosure.

Further still, in some embodiments, the brackets are configured and positioned to both support the roofing panels and provide drain channels. Such a roofing system is shown in FIG. 16. Roofing system 1600 includes a first roofing panel 1650 that includes an upper edge 1661, a lower edge 1662, a first side edge 1663 and a second side edge 1664. The first side edge 1663 is supported by a first support bracket 1680 at a first side edge 1633 and the second side edge 1664 is supported by a second support bracket 1690. First support bracket 1680 includes a front surface 1681 that supports the first roofing panel 1650. Front surface 1681 is supported by first and second legs that extend rearward from front surface 1681 along the sides of first support bracket 1680. Front surface 1681 is configured as a drain channel to direct water that flows over first side edge 1663 of first roofing panel 1650 down the roof onto another roofing panel positioned below and behind first roofing panel 1650.

In certain embodiments of the roofing system as otherwise described herein, the roofing system also includes a second support bracket disposed on the surface structure and spaced from the first support bracket. The second support bracket has the same configuration as the first support bracket and also supports the first roofing panel. For example, as shown in FIG. 13, roofing system 1300 includes a second support bracket 1390 that supports first roofing panel 1350.

In certain embodiments of the roofing system as otherwise described herein, the roofing system also includes another support bracket disposed on the surface structure that has the same configuration as the first support bracket and supports a second roofing panel. For example, as shown in FIG. 13, another support bracket is supporting the roofing panel adjacent to roofing panel 1350.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

Embodiments

Embodiment 1. A roofing system comprising:
  a plurality of riser blocks disposed on a surface structure, the plurality of riser blocks including a first group of riser blocks aligned in a first row;
  a first batten extending along the first row and supported by the first group of riser blocks, the first batten including a first clip portion; and
  a first group of roofing panels disposed along the first row and supported by the first batten, each of the roofing panels of the first group of roofing panels including a front surface, a rear surface, and a second clip portion extending from the rear surface, the second clip portion being configured to engage the first clip portion of the batten so as to secure the roofing panels to the batten.

Embodiment 2. The roofing system according to embodiment 1, wherein the first batten is secured to the support surface using a first group of mechanical fasteners.

Embodiment 3. The roofing system according to embodiment 2, wherein each of the mechanical fasteners of the first group of mechanical fasteners extends through a respective riser block.

Embodiment 4. The roofing system according to any of embodiments 1 to 3, wherein each riser block includes a slot configured to receive a mechanical fastener.

Embodiment 5. The roofing system according to any of embodiments 1 to 4, wherein each of the riser blocks is tapered so as to have a greater depth at a lower side and a smaller depth at an upper side.

Embodiment 6. The roofing system according to any of embodiments 1 to 5, wherein an upper side of each riser block includes an angled surface.

Embodiment 7. The roofing system according to any of embodiments 1 to 6, wherein a front face of each riser block includes protrusions that engage the first batten.

Embodiment 8. The roofing system according to any of embodiments 1 to 7, wherein a width of each riser block is at least 1 inch, e.g., at least 2 inches.

Embodiment 9. The roofing system according to any of embodiments 1 to 8, wherein a width of each riser block is no more than 8 inches, e.g., no more than 6 inches.

Embodiment 10. The roofing system according to any of embodiments 1 to 9, wherein at least one of the first clip portion and second clip portion are configured to flex upon engagement of the first clip portion and second clip portion.

Embodiment 11. The roofing system according to any of embodiments 1 to 10, wherein the first clip portion includes a groove that receives the second clip portion.

Embodiment 12. The roofing system according to embodiment 11, wherein a front surface of the first batten includes a support platform adjacent to the groove, and wherein the support platform supports the rear surface of each roofing panel in the first group of roofing panels.

Embodiment 13. The roofing system according to embodiment 12, wherein the support platform includes a first section disposed above the groove and a second section disposed below the groove.

Embodiment 14. The roofing system according to embodiment 12 or embodiment 13, wherein the support platform is sloped with respect to a rear surface of the first batten.

Embodiment 15. The roofing system according to any of embodiments 1 to 14, wherein the first batten includes a support ledge behind a front surface of the first batten that is configured to support an upper edge of each panel in a second group of panels.

Embodiment 16. The roofing system according to embodiment 15, wherein the support ledge is sloped with respect to a rear surface of the first batten.

Embodiment 17. The roofing system according to any of embodiments 1 to 16, wherein the first batten includes feet configured to engage a front face of each riser block of the first group of riser blocks.

Embodiment 18. The roofing system according to any of embodiments 1 to 17, wherein the first batten has a uniform cross section.

Embodiment 19. The roofing system according to any of embodiments 1 to 18, wherein an outer surface of the first batten is formed of a polymer material.

Embodiment 20. The roofing system according to any of embodiments 1 to 19, wherein a length of the first batten is at least 2 feet, e.g., at least feet 3 feet.

Embodiment 21. The roofing system according to any of embodiments 1 to 20, wherein a length of the first batten is no more than 20 feet, e.g., no more than 12 feet.

Embodiment 22. The roofing system according to any of embodiments 1 to 21, wherein the second clip portion includes a pair of projections each with an outwardly extending hook that engages the first clip portion.

Embodiment 23. The roofing system according to any of embodiments 1 to 22, wherein the second clip portion includes a plurality of clip segments that engage the first clip portion of the first batten.

Embodiment 24. The roofing system according to any of embodiments 1 to 23, wherein the first group of roofing panels are solar panels.

Embodiment 25. The roofing system according to embodiment 24, wherein each of the roofing panels in the first group of roofing panels includes a panel body and photovoltaic elements disposed in the panel body.

Embodiment 26. The roofing system according to embodiment 25, wherein the respective second clip portion of each roofing panel is attached to the panel body.

Embodiment 27. The roofing system according to embodiment 25, wherein each roofing panel includes a frame that holds the panel body, and wherein the respective second clip portion of each roofing panel is secured to the frame.

Embodiment 28. The roofing system according to any of embodiments 1 to 27, wherein the roofing system further includes non-solar roofing panels.

Embodiment 29. The roofing system according to any of embodiments 1 to 28, further comprising drain channels disposed between adjacent pairs of the roofing panels in the first group of roofing panels.

Embodiment 30. The roofing system according to embodiment 29, wherein each drain channel includes a hook at an upper end of the drain channel that is secured to an upper edge of an associated roofing panel.

Embodiment 31. The roofing system according to embodiment 29 or embodiment 30, wherein a lower end of each drain channel extends over a roofing panel in a second row of roofing panels.

Embodiment 32. The roofing system according to any of embodiments 1 to 31, further comprising:
 a second group of riser blocks of the plurality of riser blocks, the second group of riser blocks being aligned in a second row;
 a second batten extending along the second row and supported by the second group of riser blocks; and
 a second group of roofing panels disposed along the second row and supported by the second batten.

Embodiment 33. The roofing system according to embodiment 32, wherein each of the roofing panels of the second group of roofing panels includes an upper edge that is supported by the first batten.

Embodiment 34. A method of installing the roofing system according to any of embodiments 1 to 33, the method comprising:
 positioning the first batten on the first group of riser blocks; and
 securing the first group of roofing panels to the first batten by coupling the second clip portion of each roofing panel of the first group of roofing panels to the first clip portion of the first batten.

Embodiment 35. The method according to embodiment 34, further comprising securing the first batten and riser blocks of the first group of riser blocks to the surface structure using mechanical fasteners, wherein each mechanical fastener passes through the first batten and a respective riser block of the first group of riser blocks.

Embodiment 36. The method according to embodiment 34 or embodiment 35, wherein positioning the first batten on the first group of riser blocks includes:
 supporting a first end of the first batten with a first riser block of the first group of riser blocks,
 supporting a second end of the first batten with a second riser block of the first group of riser blocks, and
 positioning additional riser blocks of the first group of riser blocks under the first batten.

Embodiment 37. The method according to any of embodiments 34 to 36, wherein positioning the first batten on the first group of riser blocks includes adjusting a position of the riser blocks of the first group of riser blocks along the length of the first batten so as to place each riser block of the first group of riser blocks over a respective framing member of the surface structure.

Embodiment 38. The method according to any of embodiments 34 to 37, wherein positioning the first batten on the first group of riser blocks includes adjusting a position of a first selected riser block of the first group of riser blocks to a first height with respect to a slope of the surface structure so as to place a front face of the first selected riser block against the first batten.

Embodiment 39 The method according to embodiment 38, wherein positioning the first batten on the first group of riser blocks includes adjusting a position of a second selected riser block of the first group of riser blocks to a second height with respect to the slope of the surface structure so as to place a front face of the second selected riser block against the first batten, and wherein the second height is different from the first height.

Embodiment 40. The method according to any of embodiments 34 to 39, further comprising separating each of the riser blocks from a collection of riser blocks that are held together.

Embodiment 41. The method according to any of embodiments 34 to 40, further comprising placing an upper edge of each roofing panel of the first group of roofing panels on a support ledge of a second batten.

Embodiment 42. The method according to embodiment 41, wherein the upper edge of each roofing panel of the first group of roofing panels is placed on the support ledge of the second batten before securing the roofing panels to the first batten.

Embodiment 43. A roofing system comprising:
 a first roofing panel including an upper edge, a lower edge, a first side edge, and a second side edge;
 a first support bracket disposed on a surface structure, the first support bracket comprising:
  a front surface that supports the first roofing panel,
  first and second legs extending rearward from the front surface and holding the front surface at a distance from the surface structure,
  a lower hook disposed at a lower end of the front surface and holding the lower edge of the first roofing panel, and
  a spring disposed at an upper end of the front surface and engaging the upper edge of the first roofing panel so as to maintain the first roofing panel in the lower hook.

Embodiment 44. The roofing system according to embodiment 43, wherein an upper flange is disposed at an upper end of the front surface, and wherein the spring is coupled to the upper flange.

Embodiment 45. The roofing system according to embodiment 44, wherein the upper flange is part of an upper hook that extends over the upper edge of the first roofing panel.

Embodiment 46. The roofing system according to any of embodiments 43 to 45, wherein each leg includes a foot that is secured to the surface structure.

Embodiment 47. The roofing system according to any of embodiments 43 to 46, wherein the front surface extends below the first and second legs.

Embodiment 48. The roofing system according to any of embodiments 43 to 47, wherein each of the first and second legs includes a slot that receives a second roofing panel that extends under the lower edge of the of the first roofing panel and under the lower end of the front surface of the first support bracket.

Embodiment 49. The roofing system according to any of embodiments 43 to 48, further comprising a first drain channel disposed along the first edge of the first roofing panel.

Embodiment 50. The roofing system according to embodiment 49, wherein the first drain channel includes a first hook at an upper end that extends over the upper edge of the first roofing panel.

Embodiment 51. The roofing system according to embodiment 50, wherein a lower end of the first drain channel is supported by a lower roofing panel that extends under the first roofing panel.

Embodiment 52. The roofing system according to embodiment 51, wherein the drain channel is unattached to the surface structure.

Embodiment 53. The roofing system according to any of embodiments 49 to 51, wherein the drain channel is supported by legs.

Embodiment 54. The roofing system according to any of embodiments 43 to 53, further comprising a second support bracket disposed on the surface structure and spaced from the first support bracket, the second support bracket having the same configuration as the first support bracket and supporting the first roofing panel.

Embodiment 55. The roofing system according to any of embodiments 43 to 54, further comprising another support bracket disposed on the surface structure, the other support bracket having the same configuration as the first support bracket and supporting a second roofing panel.

Embodiment 56. A roofing system comprising:
a plurality of battens including a first batten and a second batten, wherein each batten of the plurality of battens comprises a body including a rear surface formed by a mounting base, a front surface formed by a support platform and configured to support a roofing panel, and a support ledge disposed behind the front surface that extends along a length of the batten;
a spring disposed at an upper end of the support ledge of the first batten and configured to compress in an upward direction; and
a first roofing panel extending from the first batten to the second batten, the first roofing panel including an upper edge, a lower edge, a front surface, a rear surface, and a hook extending from the rear surface, wherein the rear surface of the first roofing panel is supported by the front surface of the second batten, the hook of the first roofing panel engages the second batten so as to secure the first roofing panel to the second batten, and the upper edge of the first roofing panel engages the spring and is urged downward by the spring so as to maintain the engagement of the hook of the first roofing panel with the second batten.

Embodiment 57. The roofing system according to embodiment 56, wherein the spring forms part of the first batten.

Embodiment 58. The roofing system according to embodiment 56 or embodiment 57, wherein the support platform and support ledge form a slot, and wherein the spring is disposed within the slot of the first batten.

Embodiment 59. The roofing system according to any of embodiments 56 to 58, wherein the spring is a metal leaf spring.

Embodiment 60. The roofing system according to any of embodiments 56 to 59, wherein the stroke of the spring is greater than a length of an opening of the hook.

Embodiment 61. The roofing system according to any of embodiments 56 to 60, wherein the spring comprises at least one of: steel, hardened steel, bronze, titanium, copper alloy, or nickel alloy.

Embodiment 62. The roofing system according to any of embodiments 56 to 61, wherein the body includes an aperture, and wherein an end of the spring is secured in the aperture.

Embodiment 63. The roofing system according to any of embodiments 56 to 61, wherein the spring is fastened to the body using a fastener.

Embodiment 64. The roofing system according to any of embodiments 56 to 63, wherein the support platform is sloped with respect to the rear surface of the mounting base.

Embodiment 65. The roofing system according to any of embodiments 56 to 64, wherein the support ledge is sloped with respect to the rear surface of the mounting base.

Embodiment 66. The roofing system according to any of embodiments 55 to 65, wherein each batten includes an upwardly extending flange that fits in an opening of the hook.

Embodiment 67. The roofing system according to embodiment 66, wherein the flange is formed by an upper section of the support platform.

Embodiment 68. The roofing system according to embodiment 66 or embodiment 67, wherein the flange is tapered so as to narrow toward an upper distal end.

Embodiment 69. The roofing system according to any of embodiments 56 to 68, wherein the roofing panel includes a panel body and the hook is attached to the panel body.

Embodiment 70. The roofing system according to embodiment 69, wherein the hook is formed on a base that is secured to the panel body.

Embodiment 71. The roofing system according to embodiment 70, wherein the base extends downward from the hook, so as to form a hook opening between the base and the hook.

Embodiment 72. The roofing system according to embodiment 70 or embodiment 71, wherein the base extends upward from the hook.

Embodiment 73. The roofing system according to any of embodiments 56 to 72, further comprising a drain channel disposed under a side edge of the first roofing panel.

Embodiment 74. The roofing system according to embodiment 73, wherein the drain channel includes an upper end, a lower end, a front surface, and a rear surface, and wherein the front surface of the drain channel includes a plurality of ridges so as to form a grooved surface.

Embodiment 75. The roofing system according to embodiment 74, wherein the plurality of ridges includes a divider ridge that is positioned along the side edge of the roofing panel.

Embodiment 76. The roofing system according to any of embodiments 73 to 75, wherein the drain channel tapers outward from the upper end to the lower end.

Embodiment 77. The roofing system according to any of embodiments 73 to 76, wherein the drain channel includes a hanger extending behind the rear surface.

Embodiment 78. The roofing system according to any of embodiments 73 to 77, wherein the lower end of the drain channel is positioned between the front surface of the second batten and a rear surface of the first roofing panel.

Embodiment 79. The roofing system according to any of embodiments 73 to 78, wherein the upper end of the drain channel is secured to the first batten.

Embodiment 80. The roofing system according to any of embodiments 73 to 79, wherein the upper end of the drain channel includes a socket that fits onto the first batten.

Embodiment 81. The roofing system according to embodiment 80, where the first batten includes a forwardly extending mounting arm disposed on a lower side of the first batten that fits into the socket of the drain channel.

Embodiment 82. The roofing system according to embodiment 81, wherein a distal end of the mounting arm is disposed behind the support ledge.

Embodiment 83. The roofing system according to embodiment 81 or embodiment 82, wherein the mounting arm extends from the mounting base.

Embodiment 84. The roofing system according to any of embodiments 56 to 83, wherein each batten has a uniform cross section.

Embodiment 85. The roofing system according to any of embodiments 56 to 84, wherein an outer surface of the first batten is formed of a polymer material.

Embodiment 86. The roofing system according to any of embodiments 56 to 85, wherein a length of the first batten is at least 2 feet, e.g., at least feet 3 feet.

Embodiment 87. The roofing system according to any of embodiments 56 to 86, wherein a length of the first batten is no more than 20 feet, e.g., no more than 12 feet.

Embodiment 88. The roofing system according to any of embodiments 56 to 87, wherein the first roofing panel is one of a plurality of roofing panels.

Embodiment 89. The roofing system according to any of embodiments 56 to 88, wherein the plurality of roofing panels includes solar panels.

Embodiment 90. The roofing system according to any of embodiments 56 to 89, wherein each solar panel includes a panel body and photovoltaic elements disposed in the panel body.

Embodiment 91. The roofing system according to any of embodiments 56 to 90, wherein the roofing system further includes non-solar roofing panels.

Embodiment 92. The roofing system according to any of embodiments 56 to 91, wherein the first batten is supported by a first group of riser blocks aligned in a first row.

Embodiment 93. The roofing system according to embodiment 92, wherein the first batten is secured to the support surface using a first group of mechanical fasteners.

Embodiment 94. The roofing system according to embodiment 93, wherein each of the mechanical fasteners of the first group of mechanical fasteners extends through a respective riser block.

Embodiment 95. The roofing system according to any of embodiments 92 to 94, wherein each riser block includes a slot configured to receive a mechanical fastener.

Embodiment 96. The roofing system according to any of embodiments 92 to 95, wherein each of the riser blocks is tapered so as to have a greater depth at a lower side and a smaller depth at an upper side.

Embodiment 97. The roofing system according to any of embodiments 92 to 96, wherein an upper side of each riser block includes an angled surface.

Embodiment 98. The roofing system according to any of embodiments 92 to 97, wherein a front face of each riser block includes protrusions that engage the first batten.

Embodiment 99. The roofing system according to any of embodiments 92 to 98, wherein a width of each riser block is at least 1 inch, e.g., at least 2 inches.

Embodiment 100. A method of installing the roofing system according to any of embodiments 56 to 99, the method comprising:
  positioning the first batten and the second batten over a surface structure;
  providing a spring on a support ledge of the first batten;
  positioning an upper edge of the first roofing panel against the spring on the first batten;
  compressing the spring such that hook of the first roofing panel is positioned above the second batten; and
  positioning the hook of the first roofing panel to engage the second batten.

Embodiment 101. The method of embodiment 100, wherein positioning the first batten over the surface structure includes positioning the first batten on a first group of riser blocks.

Embodiment 102. The method according to embodiment 101, further comprising securing the first batten and riser blocks of the first group of riser blocks to the surface structure using mechanical fasteners, wherein each mechanical fastener passes through the first batten and a respective riser block of the first group of riser blocks.

Embodiment 103. The method according to embodiment 101 or embodiment 102, wherein positioning the first batten on the first group of riser blocks includes:
  supporting a first end of the first batten with a first riser block of the first group of riser blocks,
  supporting a second end of the first batten with a second riser block of the first group of riser blocks, and
  positioning additional riser blocks of the first group of riser blocks under the first batten.

Embodiment 104. The method according to any of embodiments 101 to 103, wherein positioning the first batten on the first group of riser blocks includes adjusting a position of the riser blocks of the first group of riser blocks along the length of the first batten so as to place each riser block of the first group of riser blocks over a respective framing member of the surface structure.

Embodiment 105. The method according to any of embodiments 101 to 104, wherein positioning the first batten on the first group of riser blocks includes adjusting a position of a first selected riser block of the first group of riser blocks to a first height with respect to a slope of the surface structure so as to place a front face of the first selected riser block against the first batten.

Embodiment 106. The method according to embodiment 105, wherein positioning the first batten on the first group of riser blocks includes adjusting a position of a second selected riser block of the first group of riser blocks to a second height with respect to the slope of the surface structure so as to place a front face of the second selected riser block against the first batten, and wherein the second height is different from the first height.

Embodiment 107. The method according to any of embodiments 101 to 106, further comprising separating each of the riser blocks from a collection of riser blocks that are held together.

Embodiment 108. The method according to any of embodiments 101 to 107, further comprising placing an upper edge of each roofing panel of the first group of roofing panels on a support ledge of a second batten.

What is claimed is:

1. A roofing system comprising:
  a plurality of riser blocks disposed on a surface structure, the plurality of riser blocks including a first group of riser blocks aligned in a first row, wherein each of the riser blocks is tapered so as to have a greater depth at a lower side and a smaller depth at an upper side;
  a first batten extending along the first row and supported by the first group of riser blocks, the first batten including a first clip portion; and
  a first group of roofing panels disposed along the first row and supported by the first batten, each of the roofing panels of the first group of roofing panels including a front surface, a rear surface, and a second clip portion extending from the rear surface, the second clip portion being configured to engage the first clip portion of the batten so as to secure the roofing panels to the batten.

2. The roofing system according to claim 1, wherein the first batten is secured to the support surface using a group of mechanical fasteners.

3. The roofing system according to claim 2, wherein each of the mechanical fasteners of the first group of mechanical fasteners extends through a respective riser block.

4. The roofing system according to claim 1, wherein at least one of the first clip portion and second clip portion is configured to flex upon engagement of the first clip portion and second clip portion.

5. The roofing system according to claim 1, wherein the first clip portion includes a groove that receives the second clip portion.

6. The roofing system according to claim 5, wherein a front surface of the first batten includes a support platform adjacent to the groove, and wherein the support platform supports the rear surface of each roofing panel in the first group of roofing panels.

7. The roofing system according to claim 6, wherein the support platform includes a first section disposed above the groove and a second section disposed below the groove.

8. The roofing system according to claim 1, wherein an upper side of each riser block comprises an angled surface.

9. The roofing system according to claim 1, wherein a front face of each riser block includes protrusions that engage the first batten.

10. The roofing system according to claim 1, wherein the first batten includes a support ledge behind a front surface of the first batten that is configured to support an upper edge of each panel in a second group of panels.

11. The roofing system according to claim 10, wherein the support ledge is sloped with respect to a rear surface of the first batten.

12. The roofing system according to claim 1, wherein the first batten includes feet configured to engage a front face of each riser block of the first group of riser blocks.

13. The roofing system according to claim 1, wherein the first batten includes a uniform cross section.

14. The roofing system according to claim 1, wherein the roofing panels of the first group of roofing panels are solar panels.

15. The roofing system according to claim 14, wherein each of the roofing panels in the first group of roofing panels includes a panel body and photovoltaic elements disposed in the panel body.

16. The roofing system according to claim 1, wherein the respective second clip portion of each roofing panel is attached to the panel body.

17. The roofing system according to claim 1, wherein the roofing system comprises non-solar roofing panels.

18. The roofing system according to claim 1, further comprising drain channels disposed between adjacent pairs of the roofing panels in the first group of roofing panels.

19. The roofing system according to claim 18, wherein each of the roofing panels of the second group of roofing panels includes an upper edge that is supported by the first batten.

20. The roofing system according to claim 1, further comprising:
a second group of riser blocks of the plurality of riser blocks, the second group of riser blocks being aligned in a second row;
a second batten extending along the second row and supported by the second group of riser blocks; and
a second group of roofing panels disposed along the second row and supported by the second batten.

* * * * *